(12) United States Patent
Ding et al.

(10) Patent No.: US 10,322,506 B2
(45) Date of Patent: Jun. 18, 2019

(54) SYSTEMS, DEVICES, ARTICLES, AND METHODS FOR USING TRAINED ROBOTS

(71) Applicant: Kindred Systems Inc., Vancouver (CA)

(72) Inventors: Weiguang Ding, Toronto (CA); Jan Stanislaw Rudy, Toronto (CA); Olivia S. Norton, Vancouver (CA); George Samuel Rose, Vancouver (CA); James Sterling Bergstra, Toronto (CA); Oswin Rodrigues, Toronto (CA)

(73) Assignee: Kindred Systems Inc., Vancouver (CA)

( * ) Notice: Subject to any disclaimer, the term of this patent is extended or adjusted under 35 U.S.C. 154(b) by 0 days.

(21) Appl. No.: 15/589,673

(22) Filed: May 8, 2017

(65) Prior Publication Data
US 2017/0320210 A1 Nov. 9, 2017

Related U.S. Application Data

(60) Provisional application No. 62/332,858, filed on May 6, 2016, provisional application No. 62/340,907, filed on May 24, 2016, provisional application No. 62/348,513, filed on Jun. 10, 2016.

(51) Int. Cl.
*B25J 9/16* (2006.01)
*B65G 1/137* (2006.01)

(52) U.S. Cl.
CPC .............. *B25J 9/163* (2013.01); *B25J 9/161* (2013.01); *B25J 9/1656* (2013.01); *B25J 9/1687* (2013.01); *B25J 9/1694* (2013.01); *B65G 1/1378* (2013.01)

(58) Field of Classification Search
CPC ......... B25J 9/1694; B25J 9/163; B25J 9/1656
See application file for complete search history.

(56) References Cited

U.S. PATENT DOCUMENTS

| | | | |
|---|---|---|---|
| 9,724,826 B1* | 8/2017 | Prats | B25J 9/1664 |
| 2013/0151007 A1* | 6/2013 | Valpola | B25J 9/1694 |
| | | | 700/245 |
| 2013/0343640 A1* | 12/2013 | Buehler | B25J 9/0087 |
| | | | 382/155 |
| 2015/0202770 A1* | 7/2015 | Patron | G05D 1/024 |
| | | | 700/245 |
| 2016/0303738 A1* | 10/2016 | Laurent | B25J 9/163 |

(Continued)

*Primary Examiner* — Thomas Randazzo
(74) *Attorney, Agent, or Firm* — Seed IP Law Group LLP

(57) ABSTRACT

Robotic systems, methods of operation of robotic systems, and storage media including processor-executable instructions are disclosed herein. The system may include a robot, at least one processor in communication with the robot, and an operator interface in communication with the robot and the at least one processor. The method may include executing a first set of autonomous robot control instructions which causes a robot to autonomously perform the at least one task in an autonomous mode, and generating a second set of autonomous robot control instructions from the first set of autonomous robot control instructions and a first set of environmental sensor data received from a senor. The second set of autonomous robot control instructions when executed causes the robot to autonomously perform the at least one task. The method may include producing at least one signal that represents the second set of autonomous robot control instructions.

22 Claims, 24 Drawing Sheets

(56) References Cited

U.S. PATENT DOCUMENTS

2016/0311115 A1* 10/2016 Hill .......................... G06T 7/73
2017/0166399 A1*  6/2017 Stubbs ................... B25J 9/0096
2017/0269607 A1*  9/2017 Fulop .................... B25J 9/0006
2017/0297200 A1* 10/2017 Stubbs ................... B25J 9/1679
2017/0305014 A1* 10/2017 Gildert .................. B25J 9/1664

* cited by examiner

| Trace No. | Control Instr. | A / P? | Sensor data | Task No. | Success? |
|---|---|---|---|---|---|
| ... | | | ... | | |
| T1021 | C819098 | A | D51682 | K004 | True |
| T1022 | C819098 | A | D51683 | K004 | False |
| T1023 | C812012 | P | D22341 | K044 | True |
| T1024 | C820488 | A | D22342 | K444 | True |
| ... | | | ... | | |

Fig. 11

| Record No. | First Pose | Control Instr. | A / P? |
|---|---|---|---|
| R1021 | P49123 | C819098 | P |
| R1022 | P40126 | C819098 | A |
| R1023 |  | C812012 | P |
| R1024 |  | C820488 | A |
| ... | | | |

Fig. 18

SYSTEMS, DEVICES, ARTICLES, AND METHODS FOR USING TRAINED ROBOTS

BACKGROUND

Technical Field

This disclosure generally relates to the fields of machine learning and robotics.

Description of the Related Art

Machine Learning

A computer, which is a machine, can perform or succeed at one or more related tasks as defined by a measure. The computer learns, if after exposure to information characterizing an event, the computer improves under the measure at performing the one or more related tasks. Further, the computer learns without updates to any processor-executable instructions by imperative programming.

Robots

Robots are systems, machines, or devices that are capable of carrying out one or more tasks. A robot is an electro-mechanical machine controlled by circuitry and/or a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to perform computational tasks. The computational tasks can be in aid of the physical tasks.

BRIEF SUMMARY

A method of operation in a robotic system including a robot, at least one processor in communication with the robot, and an operator interface in communication with the robot and the at least one processor. The method includes the at least one processor receiving, a first set of autonomous robot control instructions, which when executed causes the robot to autonomously perform at least one task, and receiving, from at least one sensor, a first set of environmental sensor data that represents an environment of the robot. The method also includes the at least one processor executing the first set of autonomous robot control instructions which causes the robot to autonomously perform the at least one task in an autonomous mode, and generating a second set of autonomous robot control instructions from the first set of autonomous robot control instructions and the first set of environmental sensor data, wherein the second set of autonomous robot control instructions when executed causes the robot to autonomously perform the at least one task. The method includes producing, by the at least one processor, at least one signal that represents the second set of autonomous robot control instructions.

A system including at least one processor, a robot, and an operator interface communicatively coupled to the robot and the at least one processor. The system further including at least one sensor communicatively coupled to the at least one processor, and at least one nontransitory processor-readable storage device communicatively coupled to the at least one processor and which stores processor-executable instructions thereon. The processor-executable instructions, when executed by the at least one processor, cause the at least one processor to receive a first set of autonomous robot control instructions which when executed causes the robot to autonomously perform at least one task, receive from at least one sensor, a first set of environmental sensor data that represents an environment of the robot. The processor-executable instructions, when executed by the at least one processor, further cause the at least one processor to execute the first set of autonomous robot control instructions which causes the robot to autonomously perform the at least one task in an autonomous mode, and generate a second set of autonomous robot control instructions from the first set of autonomous robot control instructions and the environmental sensor data, wherein the second set of autonomous robot control instructions when executed causes the robot to autonomously perform the at least one task, and produce at least one signal that represents the second set of autonomous robot control instructions.

A robot may be summarized substantially as described and illustrated herein.

A system may be summarized as including a robot substantially as described and illustrated herein.

A method of operation in a robotic system may be summarized substantially as described and illustrated herein.

A tangible computer readable storage medium may be summarized substantially as described and illustrated herein.

A system may be summarized as including a robot, at least one processor communicatively coupled to the robot, and at least one nontransitory computer-readable storage medium communicatively coupled to the at least one processor and which stores processor-executable instructions thereon substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings. Systems, devices, articles, and methods are described in greater detail herein with reference to the following figures in which:

FIG. 11 is a schematic diagram illustrating a data structure for use in operation of a robotic system;

FIG. 18 is a schematic diagram illustrating a data structure for use in operation of a robotic system;

DETAILED DESCRIPTION

Figure 1:
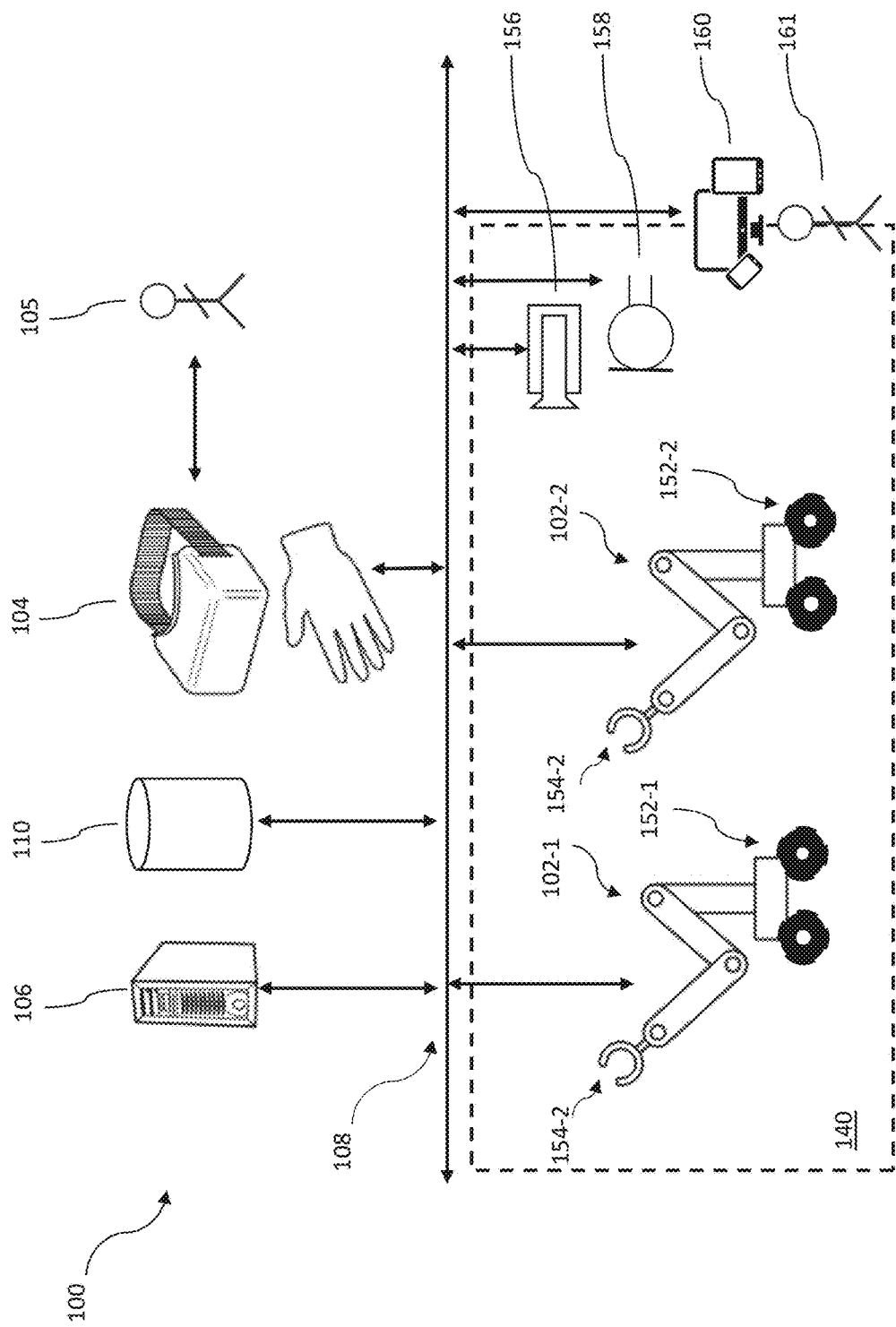
FIG. 1 is a schematic diagram illustrating a portion of a system including a robot, and an operator interface.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with machine learning and/or robotics, such as processors, sensors, storage devices, network interfaces, workpieces, tensile members, fasteners, electrical connectors, and the like have not been shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one", "an", or "another" applied to "embodiment", "example", or "implementation" means that a particular referent feature, structure, or characteristic described in connection with the embodiment, example, or implementation is included in at least one embodiment, example, or implementation. Thus, the appearances of the phrases "in one embodiment", or "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the singular forms "a", "an", and "the" include plural referents unless the content clearly dictates otherwise. Thus, for example, reference to a robotic system including "a computer server" includes a single computer server, or two or more computer servers. It should also be noted that the term "or" is generally employed in its sense including "and/or" unless the content clearly dictates otherwise.

The headings provided herein are for convenience only and do not interpret the scope or meaning of the embodiments.

It takes time to train robots. Specifically, it takes time to create autonomous control instructions from human operator defined instructions and sensor data. In a robotic system a human operator would pilot or direct a robot or operator controllable device, to perform one or more tasks. The system records traces of information including data received from one or more sensors on or proximate to the robot, and the instructions generated by the human operator. The system also acquires information that represents success or failure at the one or more tasks. The system augments the traces with labels created from the information that represents success or failure. The system creates autonomous control instructions from the traces. One or more robots execute autonomous control instructions. The system records new traces of the robot now executing autonomous control instructions to complete the one or more tasks. The system acquires new information that represents success or failure at the one or more tasks. The system creates or derives new or updated autonomous control instructions from the new traces and new information. Either the autonomous control instructions or the new autonomous control instructions can be used by the system or a similar system for run-time or production-time performance of the one or more tasks.

A robot in autonomous mode can operate by executing autonomous control instructions. Alternatively, a robot can replay or execute piloted robot control instructions. Prior to executing the piloted robot control instructions the robot can be directed to move into a position that corresponds to a first position associated with the piloted robot control instructions. The first position can be a location of a robot or a pose. Prior to executing autonomous robot control instructions the robot can be directed to move into a position that corresponds to a first position associated with piloted robot control instructions used to create the autonomous robot control instructions.

A robot in autonomous mode can operate by executing autonomous control instructions. Alternatively, a robot can replay or execute piloted robot control instructions. Prior to executing the piloted robot control instructions the robot can be directed to move into a pose that corresponds to a first pose associated with the piloted robot control instructions. The first pose can be a location of a robot, a posture for the robot, or both. The selection and execution of robot control instructions based on pose (i.e., position and/or orientation and/or posture) is described herein in relation to, at least, FIGS. 13-15. The selection robot control instructions based on posture is described herein in relation to, at least, FIG. 16.

A robot in autonomous mode can select autonomous robot control instructions based on a specified pose of the robot. Prior to executing autonomous robot control instructions, the robot can be directed to move into a specified pose that corresponds to a first pose associated with piloted robot control instructions used to create the autonomous robot control instructions. The selection autonomous robot control instructions based on pose is illustrated and described herein in relation to, at least, FIG. 17.

FIG. 1 shows an exemplary system 100 in accordance with the present system, devices, articles, and methods. Various components of system 100 are optional. As shown, the system 100 includes one or more robots 102-1, 102-2 (only two shown, singularly or collectively 102), one or more operator interfaces 104, and one or more computer systems (e.g., processor-based computer systems) 106, all communicatively coupled via one or more network or non-network communication channels 108. The system 100 can include one or more nontransitory tangible computer- and processor-readable storage devices 110 which store processor-executable instructions and/or processor-readable data. While illustrated separately from the computer system 106, in at least some implementations the one or more nontransitory tangible computer- and processor-readable storage devices 110 can be an integral part or component of the computer system 106 (e.g., memory such as RAM, ROM, FLASH, registers; hard disk drives, solid state drives).

Operator interface 104 includes one or more input devices to capture motion or actions of a human operator 105. Operator interface 104, an example of user interface, can include one or more user input devices, including those described herein, and one or more user output devices, for instance a display (e.g., LCD or OLED screen), head mounted display, speaker, and/or haptic feedback generator (e.g., vibration element, piezo-electric actuator, rumble motor). Human operator via operator interface 104 can perform a series of actions to guide a robot, e.g., robot 102-2, to accomplish at least one task.

Examples of computer system 106 are described herein. Computer system 106 may facilitate or coordinate the operation of system 100. Computer system 106 could be a processor-based computer system. The processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Computer system 106 may include a control subsystem including at least one processor. The at least one processor or the control subsystem or computer system 106 may be referred to as a controller. The computer system 106 may, in some instances, be termed or referred to interchangeably as a computer, server or an analyzer 106.

Examples of a suitable network or communication channel, such as communication channels 108, include a wire based network or non-network communication channels, optical based network or non-network communication channel, wireless (i.e., radio and/or microwave frequency) network or non-network communication channel, or a combination of wired, optical, and/or wireless networks or non-network communication channels.

System 100 can include one or more robots 102, and the like. Human operator 105 may via an interface, such as operator interface 104, pilot or direct at least one of the one or more of robots 102, in piloted mode. Robots 102 may operate in autonomous mode. Robots 102 operate in, and receive data, from one or more sensors, about an environment 140 that comprises a physical space.

A robot, like one of robots 102, is an electro-mechanical machine controlled by circuitry and/or one or more processors executing processor-executable instructions. One or more robots 102 can be controlled autonomously, for example via an on-board or a remote processor executing processor executable instructions, typically based on some sensed input data (e.g., processed machine-vision information, information that represents a level of force or weight sensed by a transducer, information representative of a distance traveled, for instance optical encoder information information). One or more robots 102 can be controlled by a human operator. Another machine, including another robot, or the like, can control the one or more robots 102.

In some instances, robots 102 may be controlled autonomously at one time, while being piloted, operated, or controlled by a human operator at another time. That is, operate under an autonomous control mode and change to operate under a piloted mode (i.e., non-autonomous). In a third mode of operation robot 102 can replay or execute piloted robot control instructions in a human operator controlled (or piloted) mode. That is operate without sensor data and replay pilot data.

A robot, like robot 102, is an electro-mechanical machine controlled by circuitry and/or a processor following processor-executable instructions; a human operator controllable electro-mechanical machine; a robotic subsystem (or apparatus) of another machine including a robot; or the like. A robot performs one or more physical tasks, for example, performing work with tangible results and/or performs computational tasks. A robot has the ability to move at least a portion of the robot in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included as a component in a larger system like system 100.

A robot 102 typically includes a propulsion or motion subsystem comprising of one or more motors, solenoids or other actuators, and associated hardware (e.g., drivetrain, wheel(s), treads), to propel the robot in a physical space. The space does not need to be horizontal or terrestrial. Examples of spaces include water, air, vertical spaces, outer space (i.e., outside the Earth's atmosphere), and the like. Drivetrain and wheels 152 is an example of a motion subsystem. A robot includes a manipulation subsystem comprising one or more appendages, such as, one or more arms and/or one or more associated end-effectors also referred to as end of arm tools (e.g., end-effector 154). An end-effector or end of arm tool is a device attached to a robotic arm or appendage designed or structured to interact with the environment. End-effectors for robot operating in unstructured environments are devices of complex design. Ideally, these are capable of performing many tasks, including for example grasp or grip or otherwise physically releasably engage or interact with an item.

Robots 102 operate in, and receive data about, an environment 140 that comprises a physical space. Robots 102 receive data from one or more sensors such as environmental sensors or internal sensors. Environmental sensors provide data that represents one or more aspect of the environmental conditions for the robots 102. Examples of environmental sensors includes camera 156 and microphone 158. The internal sensor data represents information about the internal state of a robot. For example, the internal sensor data represents a level of an internal power supply (e.g., battery, energy source, fuel cell, fuel, or the like).

A human operator 105 may pilot at least one of the one or more of robots 102, for example via operator interface 104. Alternatively, a robot may act autonomously (i.e., under its own control). In a human operator controlled (or piloted) mode, the human operator 105 observes representations of sensor data—for example, video, audio or haptic data received from one or more environmental sensors or internal sensor. The human operator then acts, conditioned by a perception of the representation of the data, and creates information or executable instructions to direct the at least one of the one or more of robots 102.

A robot, like one of robots 102, may operate in communication with communication channel(s) 108. Robots 102 may send and/or receive processor readable data or processor executable instructions via communication channel(s) 108. Robots 102 interact with one or more user interfaces. Operator interface 104 receives and/or sends processor-readable data or -executable instructions across communication channel(s) 108. Operator interface 104 creates or provides human readable representations of processor readable instructions.

The system 100 can include one or more user interface devices 160. The one or more user interface devices 160 includes one or more input and output devices such as keyboards, mice, touch displays, displays (e.g., LCD or OLED screen), and the like. The one or more user interface devices 160 may be devices in different form factors, such as, personal computer, tablet, (smart) phone, wearable computer, and the like. A person, such as a human operator or observer, could operate or utilize user interface device(s) 160 to input information that represents success or failure of a robot at the one or more tasks, and the like.

One or more human observers 161 may observe aspects of environment 140, robots 102, and the like. Observer(s) 161 may view or see a representation of the robot performing one or more tasks. For example, observer(s) 161 may review one or more still images and one or more moving images of the robots 102 in environment 140. Observer(s) 161 may be present in or proximate to environment 140 to directly experience, e.g., view, robots 102 performing one or more tasks. Observer(s) 161 may interact with user interface device(s) 160 to provide information about the robots and the one or more tasks.

While system 100 is illustrated with two robots 102, one operator interface 104, one processor-based computer system 106, and one user interface device(s) 160, any of the various implementations can include a greater or lesser number of robots 102, operator interfaces 104, processor-based computer systems 106, and user interface device(s) 160. Human operator 105 at operator interface 104 may interact computer system 100 to navigate a virtual environment (not shown).

Figure 2:
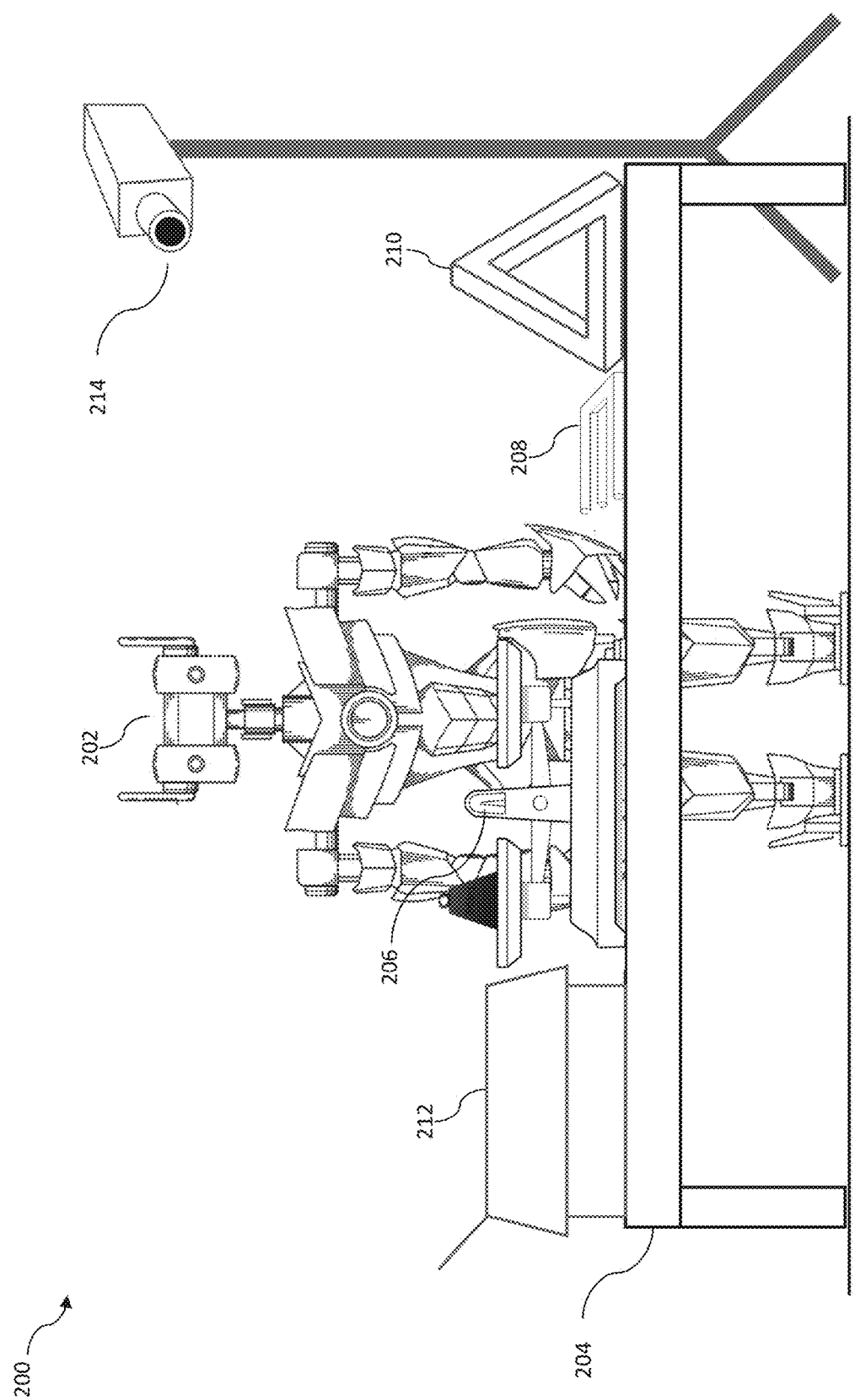
FIG. 2 is an elevation view illustrating a portion of a system including a robot, and one or more sensors.

FIG. 2 illustrates a portion of an environment 200 including a robot 202. Robot 202 may operate in many environments and environment 200 includes a workbench 204, and a scale 206. Robot 202 may receive executable instructions that, when executed, cause robot 202 to interact in and with environment 200. For example, robot 202 could receive executable instructions to place one or more items, e.g., items 208 and 210, on scale 206 and then in box 212.

Scale 206 includes circuitry (not shown) which, in response to presence of one or more items on the scale, generates at least one signal. The at least one signal includes information that represents or characterizes the presence or absence of mass on the scale. In environment 200 the at least one signal includes information that represents the mass of one or more items.

The at least one signal can include information that represents completion of at least one task by robot 202. For example, the successful completion. Here the at least one task could include grasping an item (e.g., item 208), lifting the item, and releasing the item on scale 206. The at least one task could include removing an item from scale 206. Scale 206 can be included in a system (e.g., part of system 100) which monitors successful completion of the at least one task.

Environment 200 includes at least one environmental sensor, such as camera 214, proximate to the robot. The at least one environmental sensor include one or more sensors that measure aspects or conditions in the environment to robot 202. Such sensors include cameras or other imagers, radars, sonars, touch sensors, pressure sensors, load cells, microphones, chemical sensors, or the like. The at least one environmental sensor generates information or environmental sensor data that represents aspects or conditions in the environment to robot 202. Environmental sensor data represents, in part, successful completion of the at least one task by the robot in the autonomous mode. Camera 214 generates one or more images that represent the completion of the at last one task.

Figure 3:
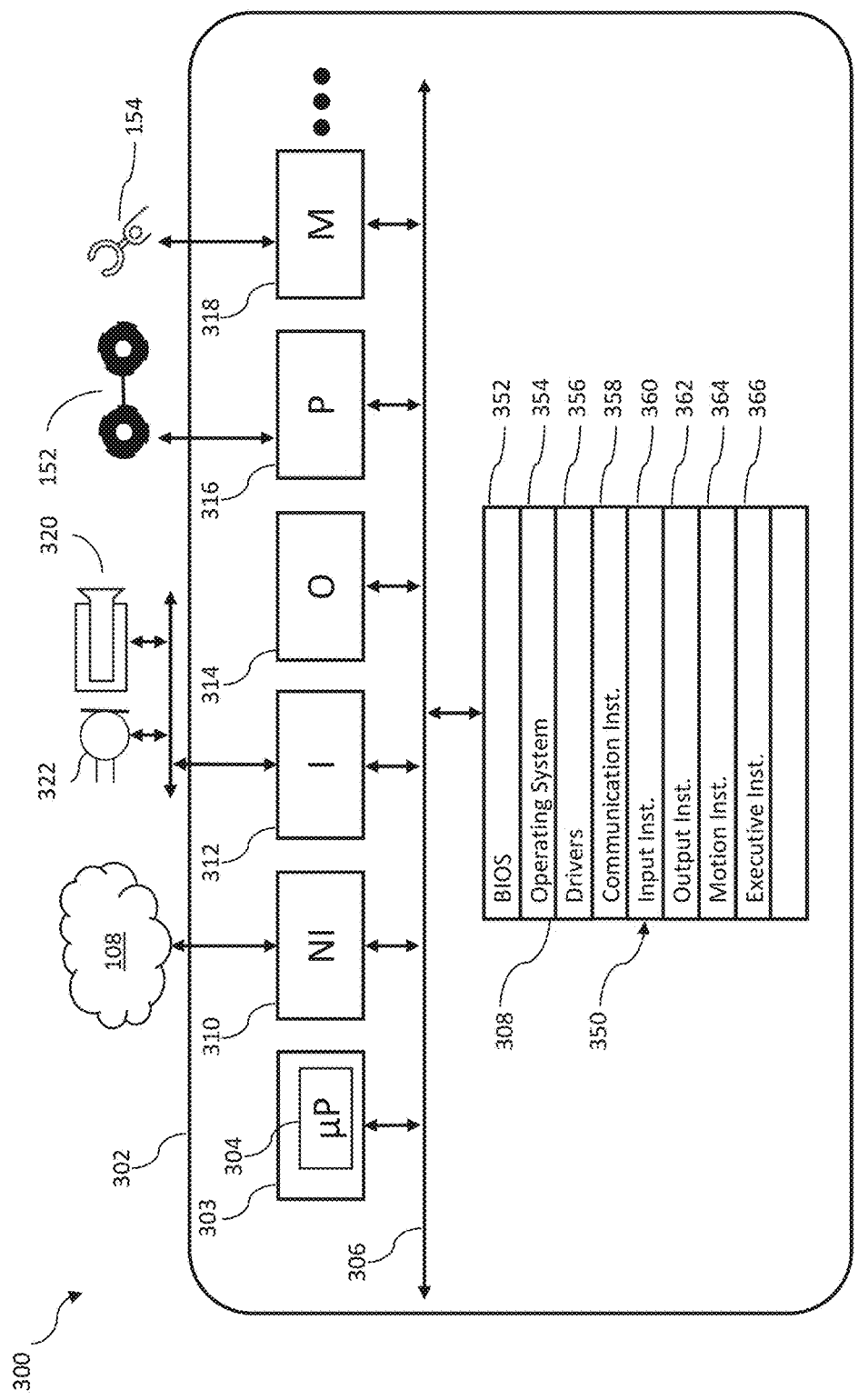
FIG. 3 is a schematic view illustrating an exemplary robot suitable for inclusion in the system of FIG. 1.

FIG. 3 illustrates an exemplary robot 300. As discussed herein, robots may take any of a wide variety of forms. FIG. 3 schematically shows parts of robot 300. Robot 300 includes at least one body 302, and a control subsystem 303 that includes at least one processor 304, at least one non-transitory tangible computer- and processor-readable storage device 308, and at least one bus 306 to which the at least one processor 304 and the at least one nontransitory tangible computer- or processor-readable storage device 308 are communicatively coupled.

The at least one processor 304 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. At least one processor 304 may be referred to herein by the singular, but may be two or more processors.

Robot 300 may include a communications subsystem 310 communicatively coupled to (e.g., in communication with)

the bus(es) 306 and provides bi-directional communication with other systems (e.g., external systems external to the robot 300) via a network or non-network communication channel, such as, communication channels 108. An example network is a wireless network. The communications subsystem 310 may include one or more buffers. The communications subsystem 310 receives and sends data for the robot 300.

The communications subsystem 310 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI compliant, BLUETOOTH compliant, cellular (e.g., GSM, CDMA), and the like.

Robot 300 includes an input subsystem 312. In any of the implementations, the input subsystem 312 can include one or more sensors that measure conditions or states of robot 300, and/or conditions in the environment in which the robot 300 operates. Such sensors include cameras or other imagers 320 (e.g., responsive in visible and/or nonvisible ranges of the electromagnetic spectrum including for instance infrared and ultraviolet), radars, sonars, touch sensors, pressure sensors, load cells, microphones 322, meteorological sensors, chemical sensors, or the like. Such sensors include internal sensors, pressure sensors, load cells, strain gauges, vibration sensors, microphones, ammeter, voltmeter, or the like. In some implementations, the input subsystem 312 includes receivers to receive position and/or orientation information. For example, a global position system (GPS) receiver to receive GPS data, two more time signals for the control subsystem 303 to create a position measurement based on data in the signals, such as, time of flight, signal strength, or other data to effect (e.g., make) a position measurement. Also for example, one or more accelerometers can provide inertial or directional data in one, two, or three axes. In some implementations, the input subsystem 312 includes receivers to receive information that represents posture. For example, one or more accelerometers or one or more inertial measurement units can provide inertial or directional data in one, two, or three axes to the control subsystem 303 to create a position and orientation measurements. The control subsystem 303 may receive joint angle data from the input subsystem 312 or the manipulation subsystem described herein.

Robot 300 includes an output subsystem 314 comprising output devices, such as, speakers, lights, and displays. The input subsystem 312 and output subsystem 314, are communicatively coupled to the processor(s) 304 via the bus(es) 306.

Robot 300 includes a propulsion or motion subsystem 316 comprising motors, actuators, drivetrain, wheels, tracks, treads, and the like to propel or move the robot 300 within a physical space and interact with it. The propulsion or motion subsystem 316 comprises of one or more motors, solenoids or other actuators, and associated hardware (e.g., drivetrain, wheel(s), treads), to propel robot 300 in a physical space. For example, the propulsion or motion subsystem 316 includes drive train and wheels 152. Propulsion or motion subsystem 316 may move body 302 in an environment.

Robot 300 includes a manipulation subsystem 318, for example comprising one or more arms, end-effectors, associated motors, solenoids, other actuators, gears, linkages, drive-belts, and the like coupled and operable to cause the arm(s) and/or end-effector(s) to move within a range of motions. For example, the manipulation subsystem 318 includes an end-effector described in relation to end-effector 154. The manipulation subsystem 318 is communicatively coupled to the processor(s) 304 via the bus(es) 306, which communications can be bi-directional or uni-directional.

Components in robot 300 may be varied, combined, split, omitted, or the like. For example, robot 300 could include a pair of cameras (e.g., stereo pair) or a plurality of microphones. Robot 300 may include one, two, or three end-effectors or end of arm tools in manipulation subsystem 318. In some implementations, the bus(es) 306 include a plurality of different types of buses (e.g., data buses, instruction buses, power buses) included in at least one body 302. For example, robot 300 may include a modular computing architecture where computational resources devices are distributed over the components of robot 300. That is in some implementations, a robot (e.g., robot 300), could have a processor in a left arm and a storage device in its thorax. In some implementations, computational resources are located in the interstitial spaces between structural or mechanical components of the robot 300. A data storage device could be in a leg and a separate data storage device in another limb or appendage. In some implementations, the computational resources distributed over the body include redundant computational resources.

The at least one storage device 308 is at least one nontransitory or tangible storage device. The at least one storage device 308 can include two or more distinct non-transitory storage devices. The storage device(s) 308 can, for example, include one or more a volatile storage devices, for instance random access memory (RAM), and/or one or more non-volatile storage devices, for instance read only memory (ROM), Flash memory, magnetic hard disk (HDD), optical disk, solid state disk (SSD), and the like. A person of skill in the art will appreciate storage may be implemented in a variety of nontransitory structures, for instance a read only memory (ROM), random access memory (RAM), a hard disk drive (HDD), a network drive, flash memory, digital versatile disk (DVD), any other forms of computer- and processor- readable memory or storage medium, and/or a combination thereof. Storage can be read only or read-write as needed. Further, systems like system 100 can conflate volatile storage and non-volatile storage, for example, caching, using solid-state devices as hard drives, in-memory data processing, and the like.

The at least one storage device 308 includes or stores processor-executable instructions and/or processor-readable data 350 associated with the operation of robot 300, system 100, and the like. Here processor-executable instructions and/or processor-readable data may be abbreviated to processor-executable instructions and/or data.

The execution of the processor-executable instructions and/or data 350 cause the at least one processor 304 to carry out various methods and actions, for example via the motion subsystem 316 or the manipulation subsystem 318. The processor(s) 304 and/or control subsystem 303 can cause robot 300 to carry out various methods and actions including receiving, transforming, and presenting information; moving in environment 140; manipulating items; and acquiring data from sensors. Processor-executable instructions and/or data 350 can, for example, include a basic input/output system (BIOS) 352, an operating system 354, drivers 356, communication instructions and data 358, input instructions and data 360, output instructions and data 362, motion instructions and data 364, and executive instructions and data 366.

Exemplary operating systems 354 include ANDROID™, LINUX®, and WINDOWS®. The drivers 356 include processor-executable instructions and/or data that allow control subsystem 303 to control circuitry of robot 300. The processor-executable communication instructions and/or data 358 include processor-executable instructions and data to implement communications between robot 300 and an operator interface, terminal, a computer, or the like. The processor-executable input instructions and/or data 360 guide robot 300 to process input from sensors in input subsystem 312. The processor-executable input instructions and/or data 360 implement, in part, the methods described herein. The processor-executable output instructions and/or data 362 guide robot 300 to provide information that represents, or produce control signal that transforms, information for display. The processor-executable motion instructions and/or data 364, when executed, cause the robot 300 to move in a physical space and/or manipulate one or more items. The processor-executable motion instructions and/or data 364, when executed, may guide the robot 300 in moving within its environment via components in propulsion or motion subsystem 316 and/or manipulation subsystem 318. The processor-executable executive instructions and/or data 366, when executed, guide the robot 300 the instant application or task for processor-based computer system 106, system 100, or the like. The processor-executable executive instructions and/or data 366, when executed, guide the robot 300 in reasoning, problem solving, planning tasks, performing tasks, and the like.

Figure 4:
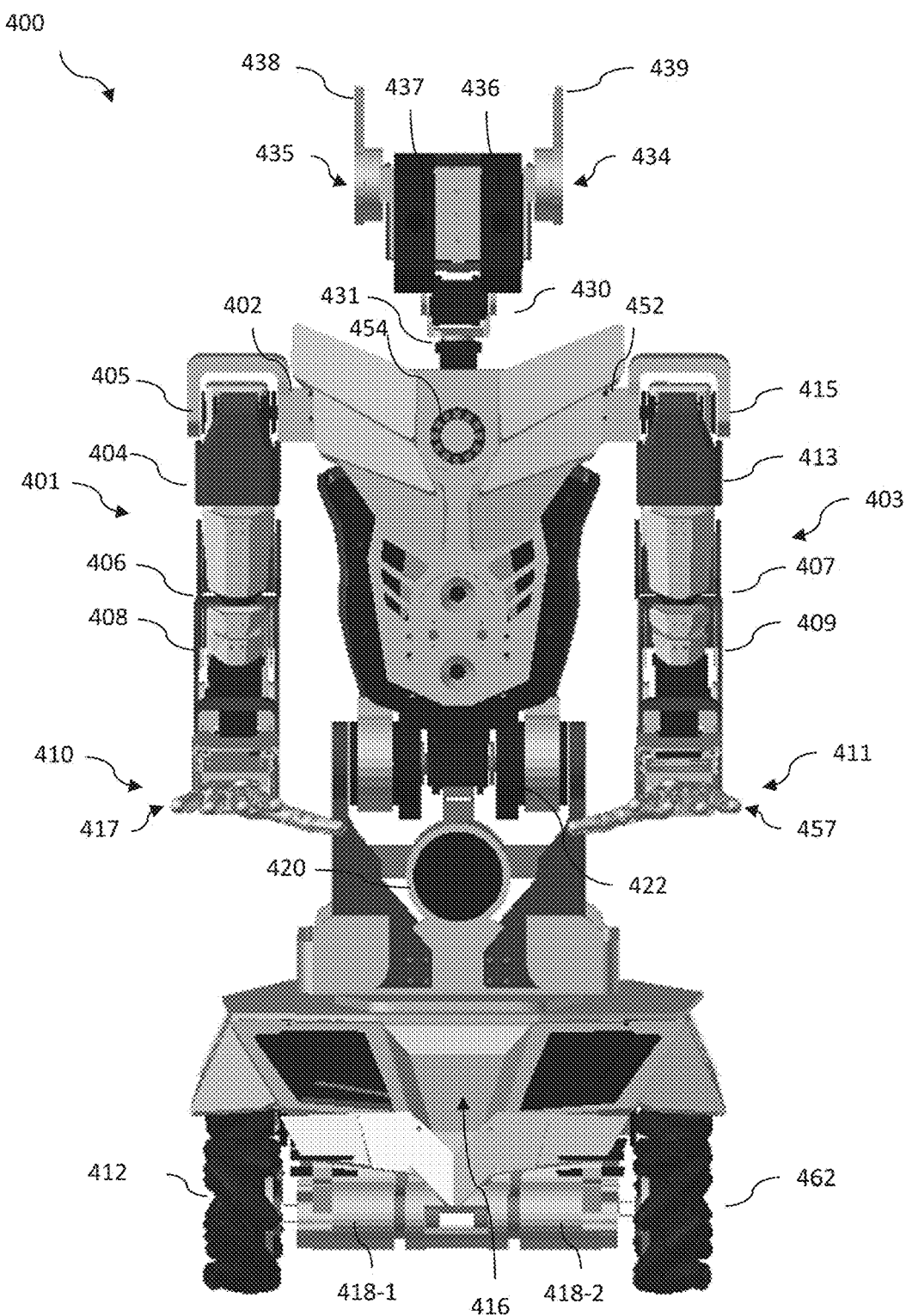
FIG. 4 is an elevation view illustrating an exemplary robot.

FIG. 4 illustrates an exemplary robot 400. As discussed herein, robots may take any of a wide variety of forms. These include human operator controllable robots, autonomous robots, and hybrid robotic robot (i.e., partially autonomous, partially piloted). A robot comprises one or more bodies, also called structural components, links, or brackets. The bodies are coupled by joints, for example, bearings, and/or servo-motors. For example, a first body is connected to a second body by a servo or the like. It is possible to describe a robot in terms of the joints or the bodies. FIG. 4 is described in terms of the joints but a person of skill in the art will appreciate a body based description is possible.

In various implementations, shoulder servos 402 and 405 may control and sense roll and pitch respectively of a shoulder of a first arm 401 of the robot 400. In some implementations, the shoulder servos 402 and 405 may, for example be DYNAMIXEL™ MX-28, MX-64, or AX-12 servo-motors produced by ROBOTIS CO. LTD. of Seoul, South Korea.

In some implementations, the shoulder yaw servo 404 may control and sense the yaw of the first arm 401 of the robot 400. In various implementations, the shoulder yaw servo 404 may be a servo-motor like shoulder servos 402 and 405. Yaw is a motion analogous to medial rotation (i.e., inward rotation toward the body) and lateral rotation (i.e., outward rotation away from the body).

In some implementations, the elbow servo 406 controls and senses an elbow of the first arm 401 of robot 400. The elbow servo 406 may be a servo-motor like shoulder servos 402 and 405.

In some implementations, the wrist servo 408 may control and sense an end-effector rotation of the robot 400. In some implementations, the wrist servo 408 maybe a servo-motor as described herein and including servos for shoulder servos 402 and 405.

In various implementations, the end-effector 410 may include a plurality of digits 417. For example, four fingers and a thumb are shown in FIG. 4. A thumb is generally regarded as a digit that may be used to oppose two more digits. In the case of an opposed pair of digits the thumb may be the shorter or less mobile digit. In some implementations, the digits of the end-effector 410 may include embedded force sensitive resistors. Respective servos, which may, for example be DYNAMIXEL™ XL-320 servo-motors or TOWERPRO™ hobby servos, may operate each digit independently. The end-effectors may, in some implementations, facilitate dexterous manipulation of items. Each of shoulder servos 402 and 405, and servo in robot 400, work cooperatively with a respective joint, or joint and gearbox. In various implementations, roll is adduction (i.e., appendage moves toward torso) and abduction (La, appendage moves away from torso) of first arm 401. In various implementations, pitch is flexion (i.e., appendage reduces angle between itself torso of more proximal appendage) and extension (i.e., appendage increases angle) (e.g., backward) of first arm 401.

In some implementations, one or more digits of digits 417 of the end-effector 410 may have polymer filled internal and external structure and/or rubber pads proximate to the extremities of the one or more digits of digits 417. The material may, in operation enhance grip capacity of an end-effector and simulate the resistance of a human finger.

In some implementations, digits, such as digits 417, may each have one or more contact sensors and/or pressure sensors to sense pressure applied to the sensor and produce signals proportional to the pressure.

The second arm 403 is generally similar to the first arm 401 but laterally mirrored (although parts may be laterally interchangeable). Referring to FIG. 4, the second arm 403 includes a shoulder roll servo 452, a shoulder pitch servo 415, a shoulder yaw servo 413, an elbow servo 407, a wrist servo 409, and end-effector 411 including a plurality of digits 457.

In at least one implementation, the robot 400 includes one or more components comprising wheels, such as wheel 412 and wheel 462, an electronics compartment 416, motors 418-1 and 418-2 (e.g., DC-motors, only two shown, singularly or collectively 418), a speaker 420, a waist pitch servo(s) 422, an interlock (to share torso support with waist pitch servo(s) 422), a single board computer (SBC) (a processor-based device not shown), two neck servos (including a head pitch servo 430 and a head yaw servo 431), ear servos 434 and 435, cameras 436 and 437, microphones 438 and 439, lights/LEDs 454, and cable bundles (not shown).

In some implementations, wheel 412 and wheel 462 provide the capacity for locomotion to the robot 400. Wheel 412 and wheel 462 may provide a broad base which, in some examples, increases stability of the robot 400. In other implementations, one or more treads or tracks can provide locomotion.

In various implementations for example, one or more on-board power sources may be found in the electronics compartment 416. The on-board power sources can, for example include one or more batteries, ultra-capacitors, fuel cells, to independently power different components of the robot 400. One or more servos can be powered by a different battery or batteries to other servos or other systems.

Exemplary batteries include secondary cells, for instance lithium polymer cells, for example, a 16V, 10000 mAh, four cell, LiPo battery; a 4000 mAh 3 cell 12 V battery; a 5 V 9600 mAh, USB mobile charging power pack; and a batter pack including one or more 3.7 V lithium ion batteries.

Figure 5:
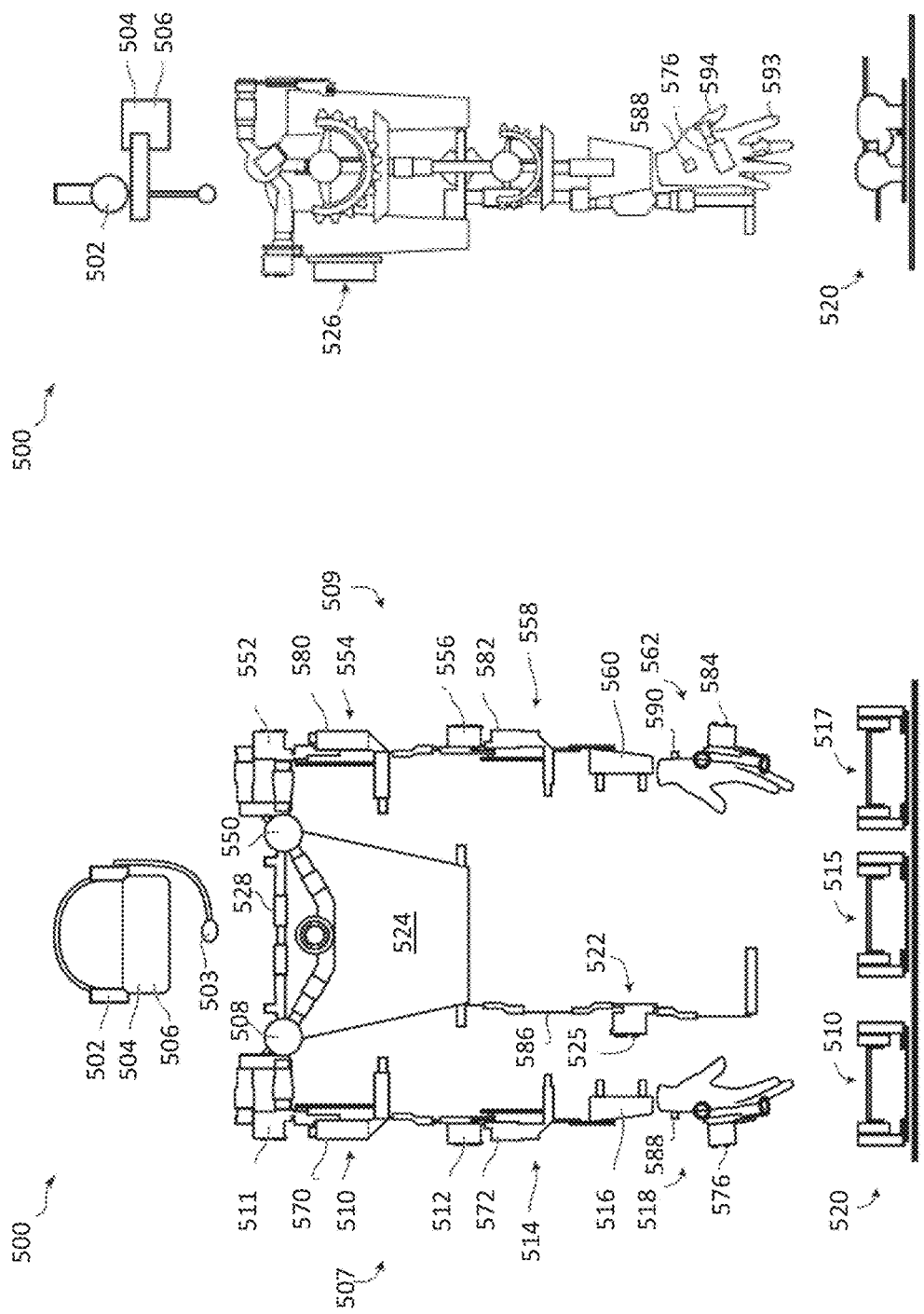
FIGS. 5A and 5B are elevation front and elevation side views, respectively, illustrating an exemplary operator interface.

FIGS. 5A and 5B illustrate aspects and parts of operator interface 500 which is an example of operator interface 104. FIG. 5A is a front elevation view of the operator interface

500. FIG. 5B is a side elevation view of the operator interface 500 shown in FIG. 5A. The operator interface 500 is designed to be partially worn and partially stood on, and physically engageable by a human operator. The operator interface 500 may include an operator interface processor, computer and processor readable storage device, display, potentiometer, speaker, a microphone, an inertial measurement unit (IMU, a class of sensor), a haptic glove or manipulator interface, and an input/output (I/O) interface, all of which, when present, are communicatively coupled to the operator interface processor. As discussed above, in various implementations an operator interface generally similar to the operator interface shown in FIGS. 5A and 5B may include fewer, additional, or alternative sensors, actuators, and/or output devices to those of the operator interface 500 shown in FIGS. 5A and 5B.

The operator interface 500 includes left/right audio output 502, a microphone 503, left/right visual display 504, a head/neck motion sensor 506, and first and second arm sensor assemblies 507 and 509.

The first arm sensor assembly 507 includes a shoulder roll servo 508, a shoulder pitch servo 511, an upper-arm rotation capture device 510, an elbow servo 512, a lower-arm rotation capture device 514, a forearm mount or strap 516, and a manipulator interface or haptic glove 518. The second arm sensor assembly 509 may be generally similar to the first arm sensor assembly 507 but mirrored. The second arm sensor assembly 509 includes a shoulder roll servo 550, a shoulder pitch servo 552, an upper-arm rotation capture device 554, an elbow servo 556, a lower-arm rotation capture device 558, a forearm mount 560, and a manipulator interface or haptic glove 562.

Operator interface 500 includes a set of two or more locomotion pedals 520, such as, first, second, and third locomotion pedals 513, 515, and 517. The operator interface also includes a torso pitch interface 522 including an extension arm and a waist servo 525, an operator vest 524, an electronics back-box 526 and a chest/shoulder suit support structure 528.

In some implementations, the left/right audio output 502 (only one called out in Figures) may be implemented using speakers or headphones to provide an interface for receiving audio information from an operator controllable robot, such as, one of robots 102, or robot 400, to an operator using operator interface 500. In some implementations, the microphone 503 provides an interface for sending audio to a human operator controllable robot or may be used to voice to command interface.

The left and right visual displays 504 may provide an interface for displaying visual information captured by cameras for the operator controllable robot, e.g., cameras 436 and 437. In some implementations, other visual information may also or alternatively be generated for display on the left and right displays 504. An example of generated information which may be displayed on the left and right visual display 504 is battery charge levels of the operator controllable robot. In some implementations, the generated information includes a metric for a robot as determined by one or more observers. In one implementation, the left and right visual display 504 includes a virtual reality headset, such as, an OCULUS RIFT™ or ALTERGAZE™, virtual reality headset, available from Oculus VR of Menlo Park, Calif., US; and Altergaze Ltd of London, UK.

The head/neck motion sensor 506 senses or captures movement of an operator's head, specifically pitch and yaw. In one implementation, the head/neck motion sensor 506 may include a gyroscope, an accelerometer, a magnetometer, and/or another inertial measurement unit (IMU). In various implementations, the head/neck motion sensor 506 is part of, e.g., built into, a virtual reality headset.

In various implementations, the shoulder roll servo 508 and the shoulder pitch servo 511 may sense or capture roll and pitch positioning of an operator's shoulder. In some implementations, the servos may include feedback resistors or potentiometers that provide signals representing servo position measurements. In some implementations, the shoulder servos 508 and 511 sense or receive information about and then simulate or replicate positions of corresponding shoulder servos in a robot, e.g., servos 402 and 405 respectively. In some implementations, these servos 508 and 511 are DYNAMIXEL™ AX-12 servos. The term "about" is employed here in the sense of represent, characterize, or summarize.

Referring still to FIG. 5A, in various implementations, the upper-arm rotation capture device 510 may sense or capture rotation of an upper arm of an operator. In some implementations, the upper-arm rotation capture device 510 includes a first semi-circular gear that curls or wraps around the upper arm and couples with a second semi-circular gear at about 90 degrees to the first. In some implementations, the first and second semi-circular gears or gear mechanisms cooperatively transfer the rotation of the upper arm to the rotation of a potentiometer 570 to the second gear. The potentiometer 570 may be centered on or around the second gear.

In some implementations, a non-moving part of the potentiometer physically couples to the operator's shoulder. In at least one implementation, the potentiometer has a wider than normal central shaft with a hole in the center. In some implementations, the potentiometer is, for example, a 39/20 mm or 44/25 mm Center Space Rotary Potentiometer from Panasonic Corp., Osaka, JP.

In some implementations, the elbow servo 512 may capture or sense an angle of an operator's elbow. For example, in at least one implementation, the elbow servo 512 is a DYNAMIXEL™ AX-12. In some implementations, the elbow servo 512 simulates or replicates positions of the elbow servo of an operator controllable robot, e.g., servo 406.

In some implementations, the lower-arm rotation capture device 514 may capture or sense the rotation of the lower arm of the operator. In some implementations, lower-arm rotation capture device 514 may operate generally similarly to the upper-arm rotation capture device 510. The lower-arm rotation capture device 514 includes a semi-circular gear that wraps around the lower arm and couples with a second semi-circular gear at 90 degrees to the first. This gear arrangement may transfer the rotation of the lower arm to the rotation of a potentiometer 572 centered around and connected to the second gear. In various implementations, a non-moving part of a potentiometer may be fixed to the operator's arm. The potentiometer 572 may, for example, be a 39/20 mm center space rotary potentiometer from PANASONIC CORP. of Osaka, Japan.

In various embodiments, the forearm strap 516 may secure the first arm sensor assembly 507 of the operator interface 500 to the operator. In some implementations, the haptic glove 518 may capture or sense a position of the operator's pointer finger and thumb relative to one another. A servo 576 may be attached to the haptic glove 518 at the center point of rotation of the thumb and pointer finger of the operator. The angle of the servo may be controlled by two armatures 593 and 594 with rings allowing coupling of the operator fingers to the armatures. One armature is attached to the operator glove thumb 594 and the second armature is affixed to the operator glove pointer finger 593. In some implementations, the servo may be configured to provide feedback information garnered from an end-effector of the operator controllable robot (e.g., robot 102) to the fingers of the operator using the operator interface 500 in the form of resistance as the operator guides the operator controllable robot to pick up an item. In some implementations, the haptic glove 518 may use a DYNAMIXEL™ AX-12 servo.

The haptic glove 518 may have a right vibrational device (e.g., vibrator) or buzzer 588, to vibrate with an amplitude or frequency that is a function of the signals coming from the finger pressure sensors of the haptic glove 518 of an operator controlled device, such as, robot 400 (FIG. 4). In some implementations, the amplitude or frequency may increase with increasing sensed pressure. The right vibrational device 588 may be mounted on the back of the operator interface glove, or elsewhere on the haptic glove.

As discussed above, the second arm sensor assembly 509 mirrors and may be generally similar to the first arm sensor assembly 507. In some embodiments, the upper-arm rotation capture device 554 includes a potentiometer 580, the lower-arm rotation capture device 558 includes a potentiometer 582, and the haptic glove 562 includes a servo 584 and a left vibrational device or buzzer 590.

In some implementations, an operator controls the locomotion pedals 520. An operator generally will selectively use one or both feet to move the pedals. The locomotion pedals 520 are arranged and tuned such that angles sensed or captured by the pedals control the motors 418 of the robot 400 and thus control locomotion of the robot 400. In some implementations, left and right forward motion pedals 517 and 513 may operate independently trigger left and right wheel pairs 462 and 412 respectively of the motion subsystem of the robot 400 and facilitate the robot 400 making turn or strafe motions.

In some implementations, the locomotion pedals 520 may include a reverse motion pedal 515 configured to control both left and right wheels 462 and 412 shown in FIG. 4. The three pedals may be fixed to a single rubber mat to prevent movement (e.g., slide) during use. In some implementations, each of the locomotion pedals 520 includes a rotating, pivoting, or swinging foot platform, a potentiometer to capture the angle of the foot platform, and a spring to return the pedal to a neutral position when the operator's foot is removed. The spring from a domestic mousetrap provides sufficient restorative force for the purpose.

In some implementations, the locomotion pedals 520 may include a pedal for the left drive train, a pedal for the right drive train, and a pedal for reverse. In some implementations, the left and right drive train pedals may provide signals which are combined to calculate a rotational and linear velocity of the operator controllable robot (e.g., robot 400).

In some implementations, a torso pitch interface 522 captures or senses how much an operator has bent forward by the angle of the operator's torso relative to their hips or legs. An extension arm 586 on which a servo 525 is mounted may connect to the operator interface 500 by a hinge. In various embodiments, the extension arm may firmly connect to the operator's upper thigh. The waist servo 525 of the torso pitch interface 522 may, for example, be a DYNAMIXEL™ AX-12 servo.

In some implementations, the operator vest 524 may provide a station, hard point, or mount structure to which components of the operator interface 500 may be attached (e.g., releasably attached). The operator vest 524 may attach and anchor the operator interface 500 firmly to the operator's body.

In some implementations, the electronics back-box 526 (FIG. 5B) may be attached to the operator vest 524 and may contain electronic components associated with the operator interface 500. In some implementations, the electronics back-box 526 may contain an ARDUINO PRO MINI™ which captures the sensor signals from the potentiometers 570, 572, 580, and 582 and controls mounted on the operator vest 524, power boards for the DYNAMIXEL™ bus, a power-breakout board which may also act as a patch panel including patching of the hand sensor signals and some ground pins, an ODROID™ which handles the wireless adapter for WI-FI communication as well as a USB2AX, a Universal Serial Bus (USB) to Transistor-Transistor Transistor Interface (TTL) connector which allows the ODROID™ to send signals to the DYNAMIXEL™ AX-12 servo or the like. The ODROID™ may also send signals to the ARDUINO PRO MINI™. The electronics back-box 526 may also contain an ARDUINO UNO™ configured to receive or capture position information (e.g., displacement) from the pedals 520.

The chest/shoulder suit support structure 528 allows for suspension of operator interface suit items from the frame rather than from the operator's limbs. In various embodiments, the chest/shoulder suit support structure 528 may facilitate transfer of the weight of the operator interface 500 off of the operator's arms and onto the operator's shoulder and back.

Figure 6:
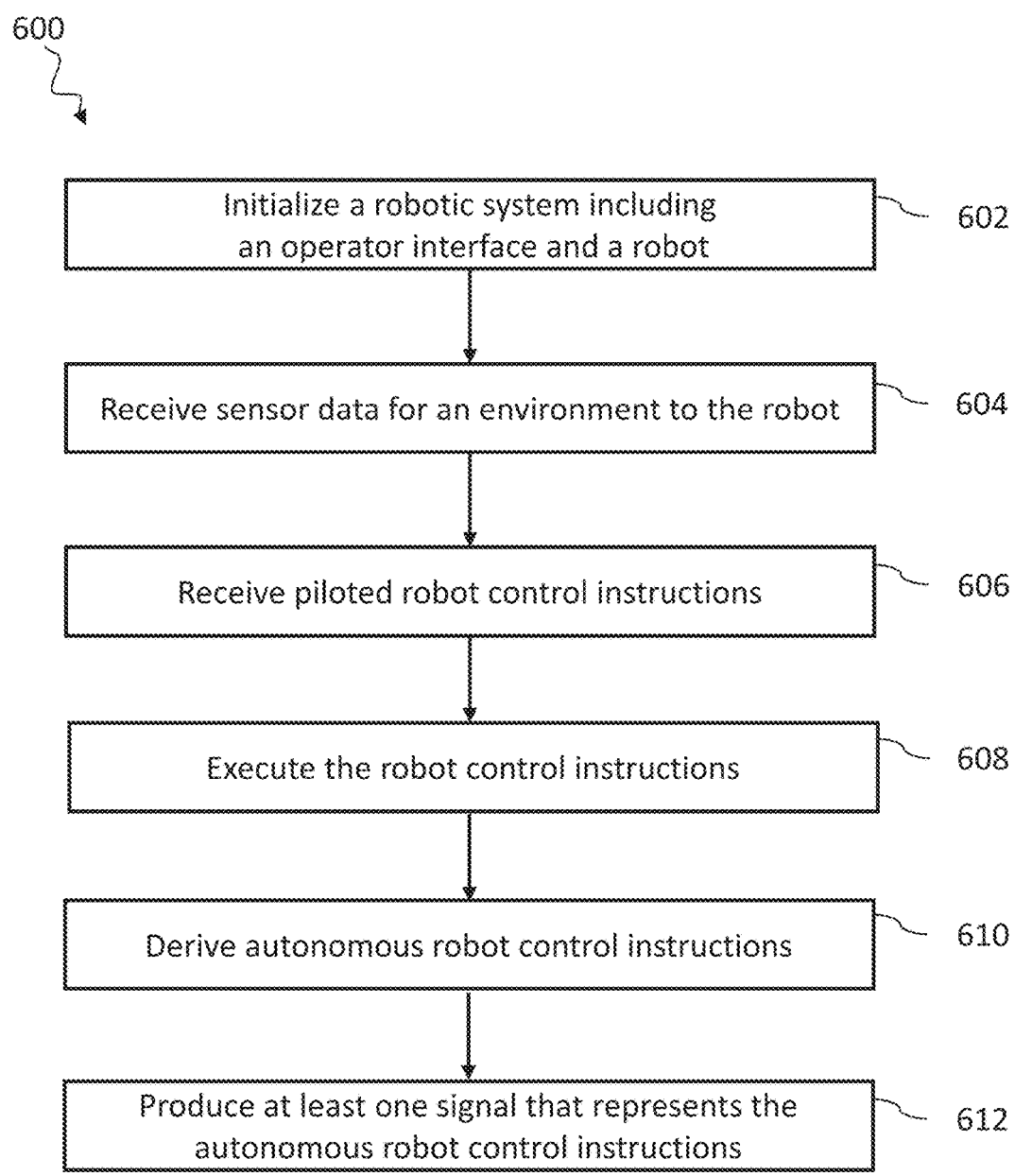
FIG. 6 is a flowchart illustrating methods of operation of a robotic system in accordance with present systems, devices, articles, and methods, in which autonomous control instructions are created based, at least in part, on sensor data and pilot generated control instructions.

FIG. 6 shows method 600 executable by a controller, such as circuitry or at least one hardware processor, for operation in a robotic system. Method 600, in part, describes how a controller may create autonomous control instructions for a robot from environmental sensor data and pilot generated robot control instructions. Those of skill in the art will appreciate that other acts may be included, removed, and/or varied or performed in a different order to accommodate alternative implementations. Method 600 is described as being performed by a controller, for example, a control subsystem or processor(s) in computer system 106 in conjunction with other components, such as, components of system 100. However, method 600 may be performed by multiple controllers or by another system.

In performing part or all of method 600, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. In performing part or all of method 600 one or more robots may be included in the operation of a robotic system. Exemplary robots are described herein.

Method 600 begins, for example, in response to an invocation by the controller. At 602, the controller initializes a robotic system including an operator interface and a robot. For example, a controller causes a robot, such as, robot 102-1, to boot and await instructions for operation in piloted mode. The controller can direct an operator interface, such as, interface 104, to activate or turn on, establish communication with a robot, and await input from a human operator.

At 604, the controller receives sensor data from one or more sensors associated with the robot. The sensor data includes environmental sensor data and/or internal sensor data. The environmental sensor data represents information about an environment associated with the robot. For example, one or more defined conditions or defined features of the environment. One or more environmental sensors proximate to the robot generates the environmental sensor data. For example, camera 156, microphone 158, camera 214, and other sensors described herein are environmental sensors. The sensor data may be used to generate a representation of the environment associated with the robot. The sensor data may be used to generate a representation of the internal state of the robot. A representation may be presented to the human operator at the operator interface. The human operator can move or act in response to the representation.

The environmental sensor data may represent information sensed by other types of sensors that may be included in a robot. These sensors may include a touch or force feedback sensor, a location sensor, such as a global positioning system (GPS), a range finder detecting proximity to a feature of the environment, a proximity sensor for detecting feature proximity, a chemical sensor, a temperature sensor, inertial measurement sensor, and/or an orientation sensor such as a gyroscope. The environmental sensor data may include location information, feature proximity information, force feedback information, chemical information, temperature information, kinematic information, and orientation information. These sensors may be included in a robot or located in the environment in which the robot operates.

The internal sensor data is generated by one or more internal sensors. The internal sensor data represents information about the internal state of a robot. For example, the internal sensor data represents a level of an internal power supply (e.g., battery, energy source, fuel cell, fuel, or the like). An internal sensor may be part of a servomotor or actuator in, or the servo/actuator systems of, a robot. Internal sensors may include an inertial measurement sensor, shared with or separate from an inertial measurement sensor that can produce environmental sensor data. The inertial measurement sensor may produce kinematic information about the position, velocity, or acceleration of a robot or one of its appendages. Internal sensors may include an orientation sensor such as a gyroscope.

At 606, the controller receives piloted robot control instructions. The controller receives a signal containing information that represents robot control instructions which, when executed, cause the robot to simulate or replicate an action taken by a human operator at an operator interface. The human operator may be moving in response to a display of a representation of the environment to the robot. The movement of the human operator can, for example via detected or sensed via an operator interface, for instance the operator interface 500 (FIGS. 5A, 5B).

At 608, the controller executes the robot control instructions which causes the robot to mimic or replicate an action taken by the human operator at an operator interface. The robot control instructions are processor readable and processor executable. When executing the robot control instructions, received in act 606, the robot operates in piloted mode. In piloted mode, the controller executes the robot control instructions in real-time (e.g., without added delay) as received from the operator without taking into account or revision by the controller based on sensed information. For example, the human operator may take action at the operator interface to cause the robot to kick a red ball. The controller can use the sensor data associated the robot control instructions and the robot control instructions to generate autonomous robot control instructions for subsequent use. For example, by using deep learning techniques to extract features from the sensor data such that in autonomous mode the robot autonomously recognize features and/or conditions in its environment and in response perform a defined set of acts or a task, for instance recognizing the presence of a red ball, or any colour ball, depending on the features extracted from the sensor data, and kicking the ball. In the absence of a ball, the robot executing the autonomous robot control instructions would not kick the air as if a ball was present.

The controller may perform acts 604 and 608 two or more times to create a plurality of traces, which can be stored in nontransitory computer- or processor-readable media. Each trace in the plurality of traces represents an occurrence of the at least one task performed by the robot. Each trace includes information that represents for the occurrence the sensor data and the robot control instructions.

At 610, the controller derives autonomous robot control instructions from the piloted robot control instructions and the sensor data. When executed by a processor the autonomous robot control instructions cause a robot to autonomously make at least one action. That is, the robot, executing the autonomous robot control instructions, will operate in autonomous mode. The autonomous control instructions are predicated on sensor data. That is, how, when, and why a robot takes action is context dependent. For example, if a pilot caused a robot to kick a ball, the robot in autonomous mode could kick a ball if one were presented to the robot but in the absence of a ball likely would not kick the air as if a ball were present. Examples of methods a processor-based device may use to device autonomous robot control instructions are described in commonly assigned U.S. patent application Ser. No. 15/051,180.

At 612, the controller derives produces or generates at least one signal that includes information that represents the autonomous robot control instructions. The controller may return the information that represents the autonomous robot control instructions. For example, using the at least one signal the controller may store some or all of the information that represents the autonomous robot control instructions on or within at least one tangible computer readable storage media, e.g., nontransitory computer- and processor-readable storage device(s) 110. For example, the controller may send the at least one signal over a network or non-network communication channels, e.g., communication channels 108.

Method 600 ends until invoked again. Method 600 may be invoked by a local agent or a remote agent. Example agents may include a processor-based device operated by human, an application being executed by a processor-based device, a robot, and the like. Method 600 may be referred to as a prime or seed process. At the end of a seed process, the autonomous robot control instruction will have been generated in view of a plurality of traces. Each trace represents an occurrence of the at least one task performed by the robot in piloted mode. The number of traces may not be sufficient. A bootstrap process may be desirable to enlarge the plurality of traces.

Figure 7:
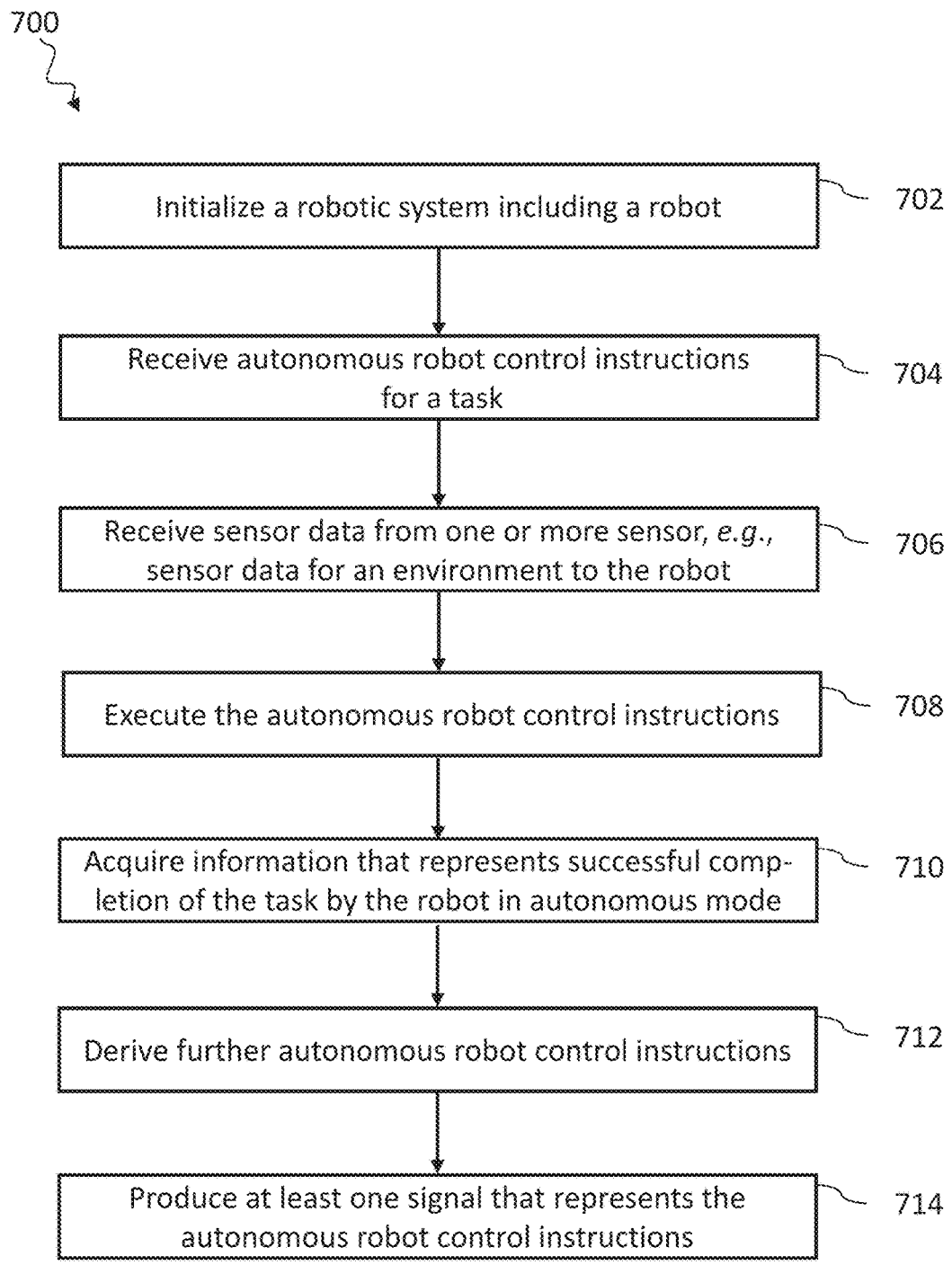
FIG. 7 is a flowchart illustrating methods of operation of a robotic system in accordance with present systems, devices, articles, and methods, which creates autonomous robot control instructions from sensor data and autonomous robot control instructions.

FIG. 7 illustrates method 700 executable by a controller, such as circuitry or at least one hardware processor, for operation in a robotic system. Method 700 describes, in part, acts which, when executed by a controller, cause the controller to create autonomous robot control instructions from sensor data and autonomous robot control instructions. Those of skill in the art will appreciate that other acts may be included, removed, and/or varied or performed in a different order to accommodate alternative implementations. Method 700 is described as being performed by a controller, for example, a control subsystem or processor(s) in computer system 106 in conjunction with other components, such as, components of system 100. However, method 700 may be performed by multiple controllers or by another system.

Method 700 begins, for example, in response to an invocation by the controller. At 702, the controller initializes a robotic system including a robot. For example, a controller causes a robot, such as, robot 102-1, to boot and await instructions for operation in autonomous mode.

At 704, the controller receives autonomous robot control instructions for a task. The controller may receive a signal including information that represents robot control instructions which, when executed, cause the robot operate in autonomous mode. The autonomous robot control instructions are processor-readable and processor-executable. The controller may store the autonomous robot control instructions on or within at least one nontransitory computer- or processor-readable medium. For example, the controller could update computer- or processor-readable information on or within at least one nontransitory computer- or processor-readable medium. The autonomous robot control instructions received by the controller at 704 may be referred to as a first set of autonomous robot control instructions. The autonomous robot control instructions received by the controller at 704 may have been created in a seed process similar to the seed processor described above in reference to the method 600 (FIG. 6).

At 706, the controller receives sensor data from one or more sensors for the robot. The sensor data includes environmental sensor data and/or internal sensor data. The environmental sensor data is generated by one or more environmental sensors proximate to the robot and for an environment associated with the robot. The environmental sensor data includes information that represents aspects of the environment to the robot, for example, robot 202. One or more internal sensors on the robot, e.g., robot 102-1, generate the internal sensor data.

At 708, the controller executes the autonomous robot control instructions which causes the robot to perform the task in autonomous mode. The autonomous robot control instructions are processor-readable and processor-executable. The autonomous robot control instructions may be predicated on the sensor data. For example, the robot may not start a task until the robot executing the autonomous robot control instructions determines the task is appropriate in view of the sensor data. For example, the robot may perform a task differently in view of the sensor data. In some implementations, the task is at least one task. The controller may execute the autonomous robot control instructions one or more times or instances.

At 710, the controller acquires (e.g., generates, receives) information that represents successful completion of the task by the robot. The information can represent performance of the robot. For example, the information represents successful completion of the task by the robot in the autonomous mode. The information may include sensor data for the robot e.g., characterizes the state of the robot. The information may be, or derived from annotations or observation, provided by an observer to the robot performing at least one task. See further description and drawings herein at, at least, FIG. 9. The information may be derived from sensor data, such as, environmental sensor data. See further description and drawings herein at, at least, FIG. 10.

The controller may perform acts 706 and 708 two or more times to create a plurality of traces. A trace may include a record, e.g., a record in ordered series, of processor-executable instructions and processor-readable data associated with a robot, an environment, interaction between the robot and the environment, and the like. One or more traces may be used for learning in a machine learning system. The controller may perform act 706, 708, and 710 two or more times to create the plurality of traces.

At 712, the controller derives further (a second set of) autonomous robot control instructions from the (first set of) autonomous robot control instructions, the sensor data, and the information that represents successful completion of at least one task by the robot. The further autonomous robot control instructions, when executed, cause the robot to take at least one action autonomously. That is, a robot, executing the further autonomous robot control instructions, will operate in autonomous mode. Details of derivation of autonomous robot control instructions are described in commonly assigned U.S. patent application Ser. No. 15/051,180.

At 714, the controller derives produces or generates at least one signal that includes information that represents the further autonomous robot control instructions. The controller may return the information that represents the autonomous robot control instructions. For example, using the at least one signal the controller may store some or all of the information that represents the further autonomous robot control instructions on or within at least one tangible computer-readable storage media, e.g., nontransitory computer- and processor-readable storage device(s) 110. For example, the controller may send the at least one signal over a network or non-network communication channels, e.g., communication channels 108.

Method 700 ends until invoked again. Method 700 may be invoked by a local agent or a remote agent. Example agents may include a processor-based device operated by human, an application running on a processor-based device, a robot, and the like. Method 700 may be referred to as a bootstrap process. In some implementations, the controller may generate or derive the further autonomous robot control instructions by taking samples from a first plurality of traces generated in the seed process and a second plurality of traces generated in the bootstrap process. For example, the controller can sample from the (first set of) autonomous robot control instructions, the sensor data associated with the robot operating in autonomous mode, the information that represents successful completion of the task by the robot in autonomous mode, as well as, the piloted robot control instructions, e.g., from method 600, the sensor data associated with the robot operating in piloted mode, the information that represents successful completion of the task by the robot in piloted mode. That is, the controller may mix traces from the operation of the robot in piloted mode and autonomous mode to create the further autonomous robot control instructions.

Figure 8:
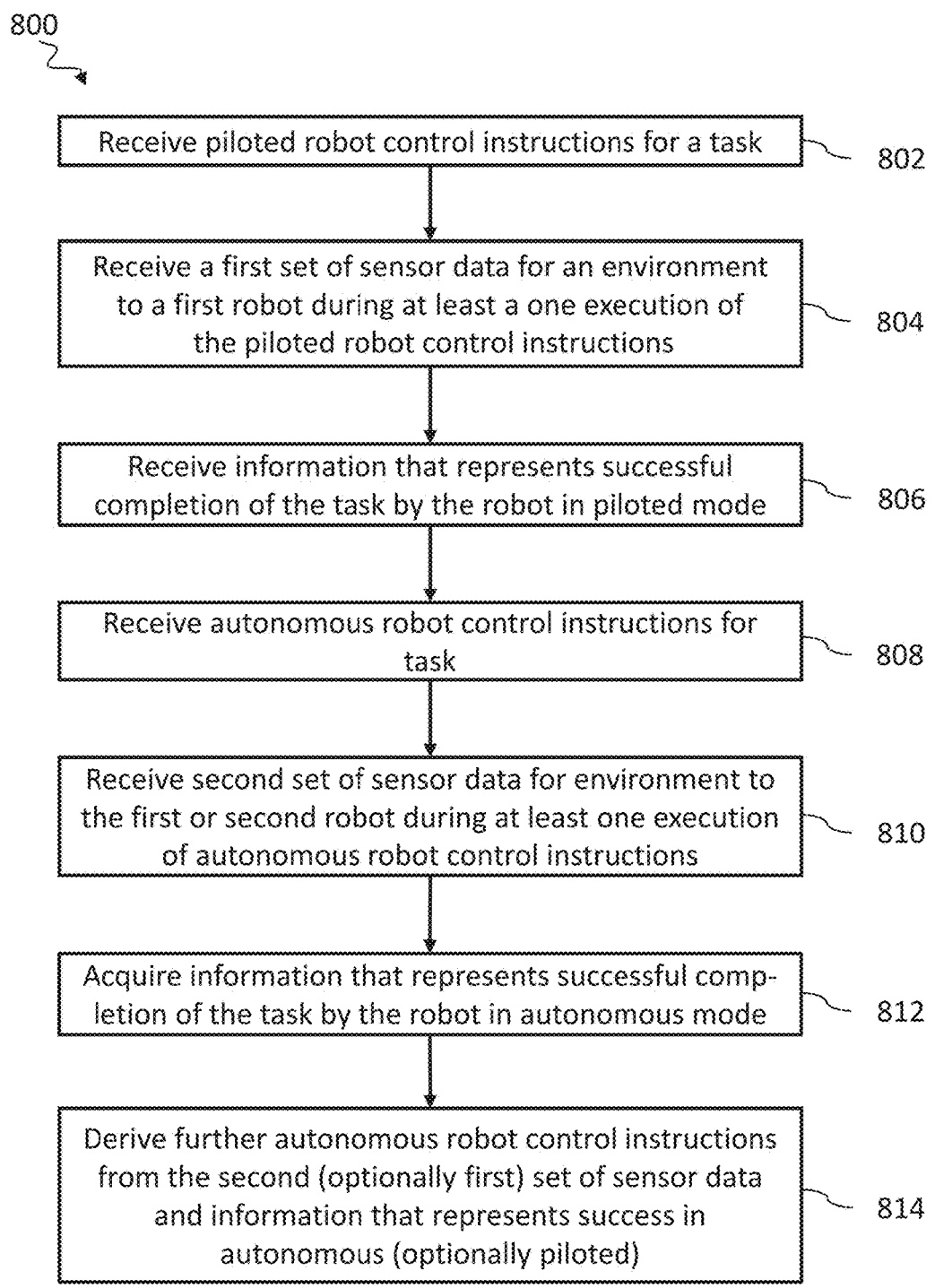
FIG. 8 is a flowchart illustrating methods of operation of a robotic system in accordance with present systems, devices, articles, and methods, in which autonomous robot control instructions are derived.

FIG. 8 illustrates method 800 executable by a controller for operation in a robotic system. Method 800, in response to execution by a controller, directs the controller to derive autonomous robot control instructions. Method 800 includes acts, or variations of acts, from methods 600 and 700. Those of skill in the art will appreciate that other acts may be included, removed, and/or varied or performed in a different order, to accommodate alternative implementations. Method 800 is described as being performed by a controller, for example, a control subsystem or processor(s) in computer system 106 in conjunction with other components, such as, components of system 100. However, method 800 may be performed by multiple controllers (i.e., circuits or circuitry) or by another system.

Method 800 begins, for example, in response to an invocation by the controller. At 802, the controller receives piloted robot control instructions for a task. In some implementations, the controller receives piloted robot control instructions for at least one task. At 804, the controller receives a first set of sensor data for an environment to a first robot during the execution of the piloted robot control instructions. For example, a first robot executes the piloted robot control instructions. At 806, the controller receives information that represents successful completion of the task by the first robot in piloted mode. The piloted robot control instructions, the first set of sensor data for the environment to the first robot, information that represents successful completion of the task by the first robot may include information that represents one or more instance of the first robot performing the task.

At 808, the controller receives (a first set of) autonomous robot control instructions for the task. At 810, in some implementations, the controller receives a second set of sensor data for an environment to a second robot during at least a one execution of the autonomous robot control instructions by the second robot. In some implementations, the controller receives, in act 810, the second set of sensor data for an environment to the second robot during at least a one execution of the autonomous robot control instructions by the second robot. The first robot and the second robot can be in the same environment or located in different environments from one another. At 812, the controller acquires (e.g., receives) information that represents successful completion of the task by the second robot in autonomous mode.

Acts 808, 810, and 812 may be performed by or in relation to the first robot. In some implementations, the first robot may be in a first environment for acts 802, 804, and 806; and in a second environment for acts 808, 810, and 812.

At 814, the controller derives or produces further (or a second set of) autonomous robot control instructions from at least the second set of sensor data and the information that represents successful completion of the task by the second robot in autonomous mode. In some implementations, the controller derives the further autonomous robot control instructions from at least the piloted robot control instructions, the second set of sensor data, and the information that represents successful completion of the task by the first robot in piloted mode.

Method 800 ends until invoked again. Method 800 may be invoked by a local agent or a remote agent. Example agents may include a processor-based device operated by human, an application running on a processor-based device, a robot, and the like. Method 800 may be performed offline by a processor-based device such as computer system 106. Aspects of method 800 are further described and show in relation to method 1200 shown in FIG. 12.

Figure 9:
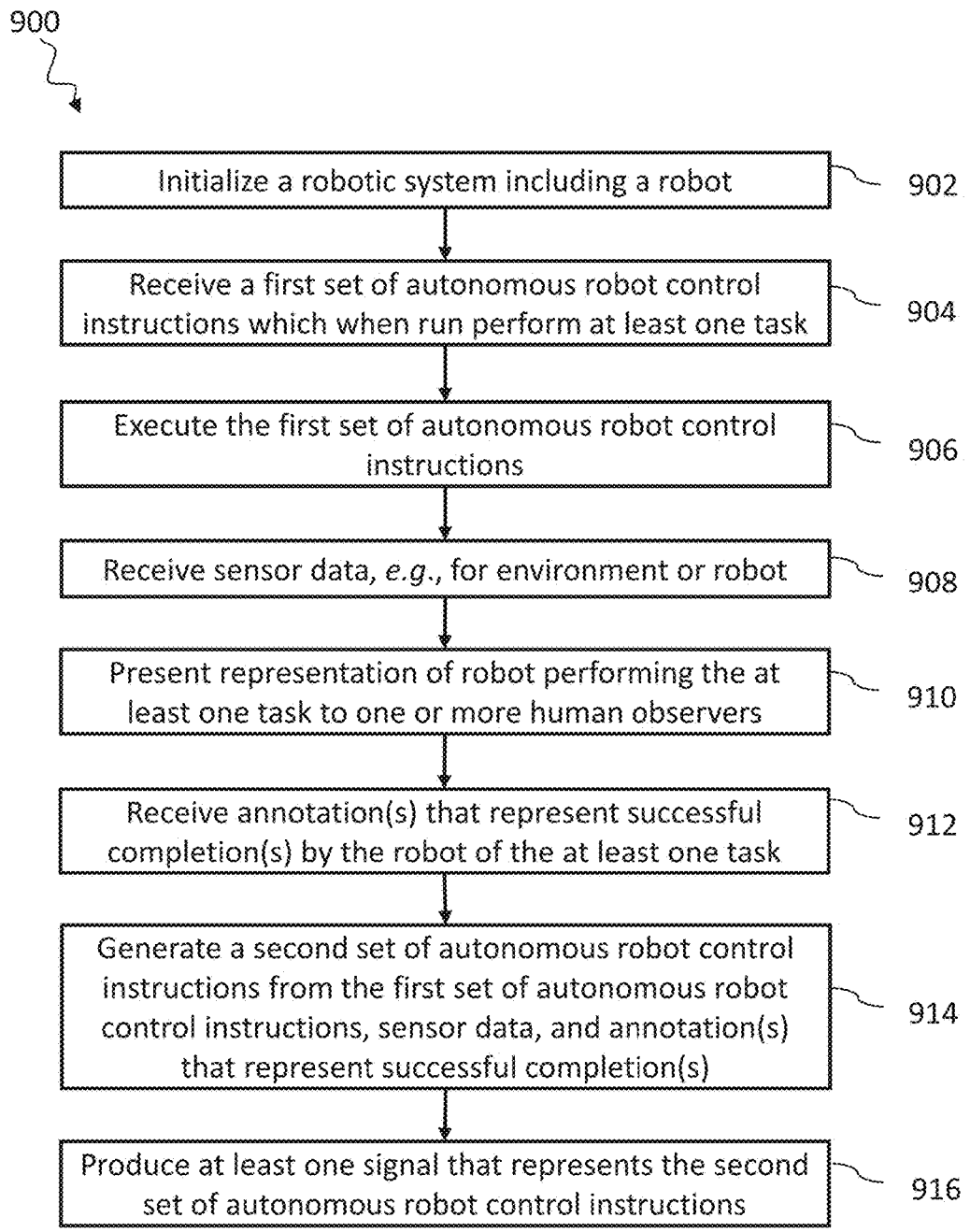
FIG. 9 is a flowchart illustrating methods of operation of a robotic system in accordance with present systems, devices, articles, and methods, in which autonomous robot control instructions are created from sensor data associated with a robot over at least one task, and annotations that represent the robot's successfully completion of the at least one task.

FIG. 9 illustrates method 900 executable by a controller, such as circuitry or at least one hardware processor, for operation in a robotic system. In execution of the method 900, the controller may create autonomous robot control instructions from sensor data associated with a robot over at least one task, and annotations that represent the robot's successfully completion of the at least one task. Those of skill in the art will appreciate that other acts may be included, removed, and/or varied or performed in a different order, to accommodate alternative implementations. Method 900 is described as being performed by a controller, for example, a control subsystem or processor(s) in computer system 106 in conjunction with other components, such as, components of system 100. However, method 900 may be performed by multiple controllers or by another system.

Method 900 begins, for example, in response to an invocation by the controller. At 902, the controller initializes a robotic system including a robot. For example, a controller causes a robot, such as, robot 102-2, to boot and await instructions for operation in autonomous mode.

At 904, the controller receives a first set of autonomous robot control instructions. The controller may receive a signal containing information that represents the first set of robot control instructions which, when executed, causes the robot operate in autonomous mode. When the processor executes the first set of robot control instructions the robot is directed to perform at least one task. The controller may store the autonomous robot control instructions on or within at least one nontransitory computer- or processor-readable medium.

At 906, the controller executes the autonomous robot control instructions. In response to the execution of the autonomous robot control instructions, the controller causes the robot to perform the at least one task in autonomous mode. The execution of the autonomous robot control instructions may be predicated on the sensor data. That is, the robot will act differently in different response to sensor data that reflects characteristic differences between two or more different environments or between two or more different internal states of the robot. The controller may execute the autonomous robot control instructions at least once, and cause the robot to perform the at least one task in one or more instances.

At 908, the controller receives sensor data from one or more sensors for an environment or for the robot. The sensor data is representative of sensed external and/or internal characteristics that correspond to at least one instance of the robot performing the at least one task. The sensor data can be representative of one or more times during which the task is performed. For example, sensor data may be representative of external and/or internal characteristics sensed or measured at a start of performance of a task, at an end of performance of a task, and/or at one or more times or points between the start and the end of performance of the task. The sensor data includes environmental sensor data and/or internal sensor data. The environmental sensor data is generated by one or more environmental sensor data sensors proximate to the robot and for an environment associated with the robot (e.g., robot 202. One or more internal sensors on the robot (e.g., robot 102-1) generate the internal sensor data.

At 910, the controller causes presentation of a representation of the robot performing the at least one task to one or more human observers. The representation of robot performing the at least one task may be based on the sensor data, sensor data and autonomous robot control instructions, and the like. For example, human observer 161 (FIG. 1) could view, within user interface device(s) 160, a representation of robot 102-1 in environment 140. The human observer could watch, directly or indirectly, the robot perform a task like grip an item. The human observer could watch, directly or indirectly, the robot perform a task such as identify an item, releasing a previous grasped an item, and placing an item in an order container or a box.

At 912, the controller receives one or more annotations that represents successful completion of the task by the robot for the at least one task. The annotations may be from one or more human observers. For example, the one or more human observers view the robot performing the at least one task in one or more instances and annotate a time series with information that represents successful completion of the at least one task in the autonomous mode. The one or more human observers may view the representation of robot performing the at least one task. The representation of robot performing the at least one task may include multiple instances of the robot performing the at last one task. Not all instances will lead to successful completion of the at least one task by the robot. The human observers may be asked, via a user interface, to note the instances where a robot succeeds at a task. The information may include instances of success, or success and failure. In some implementations, the controller receives one or more annotations for a video feed or sequence of images. In some implementations the video feed or sequence of images are received from a camera or other imager with a semi-omnipotent (e.g., birds eye) view or perspective (e.g., field of view, effect range). In some implementations the video feed or sequence of images could be augmented with data from additional sensors, e.g., circuits in scale 206 of FIG. 2. Examples systems, devices, and methods of the collection of annotations or observations from one or more observers are described in commonly assigned U.S. Provisional Patent Application No. 62/261, 602.

At 914, the controller generates or derives a second set of autonomous robot control instructions from the first set of autonomous robot control instructions, the sensor data, and the annotation(s) that represent successful completion(s) by the robot of the at least one task. The second set of autonomous robot control instructions, when executed, cause the robot to take the at least one action autonomously. Details of exemplary derivations of autonomous robot control instructions are described in commonly assigned U.S. patent application Ser. No. 15/051,180.

At 916, the controller derives, produces or generates at least one signal that includes information that represents the second set of autonomous robot control instructions. The controller may return the second set of autonomous robot control instructions. For example, using the at least one signal the controller may store some or all of the information that represents the second set of autonomous robot control instructions on, or within, at least one tangible nontransitory computer- and processor-readable storage media. For example, the control sends the at least one signal over a network or non-network communication channel.

Method 900 ends until invoked again. Method 900 may be invoked by a local agent or a remote agent.

Figure 10:
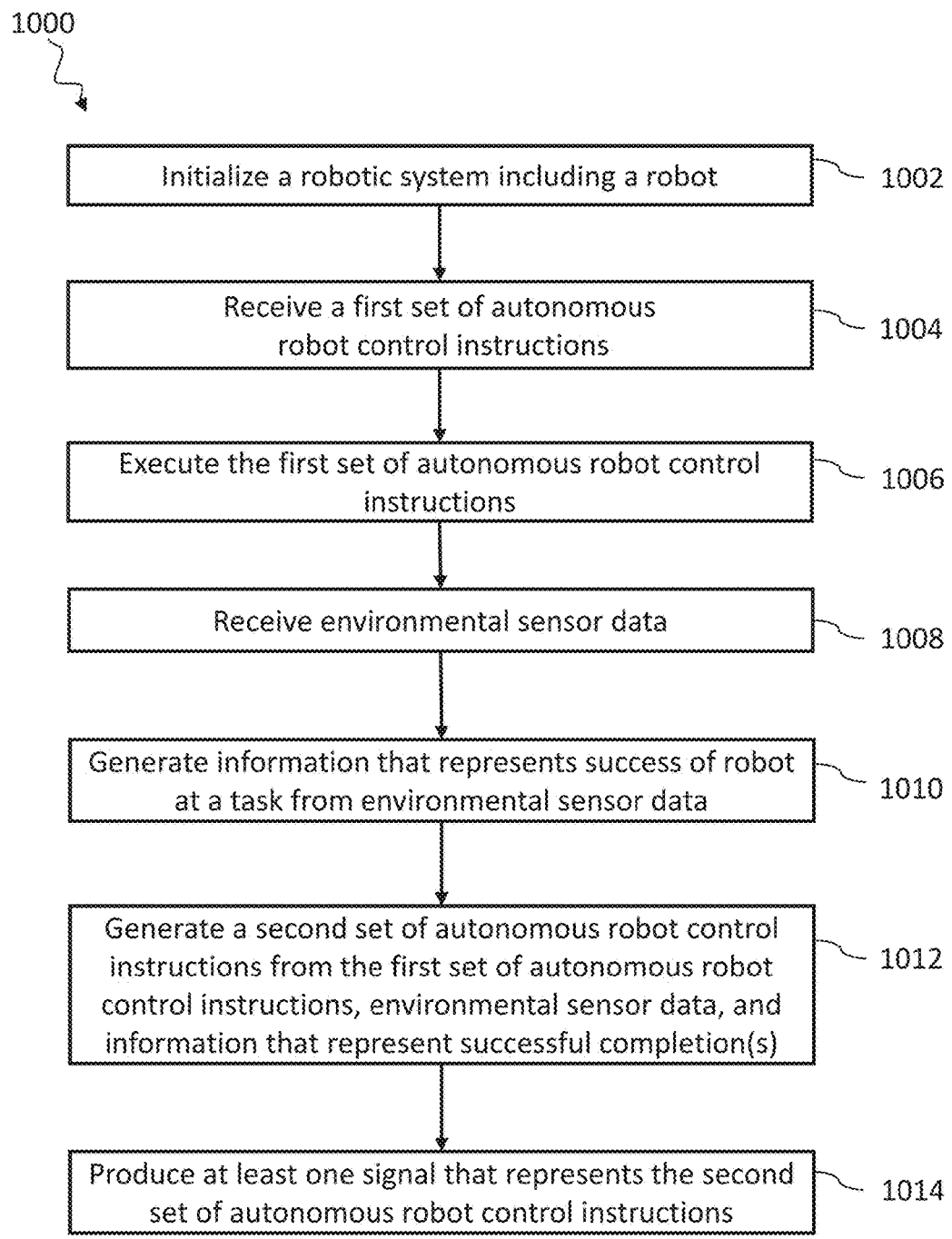
FIG. 10 is a flowchart illustrating methods of operation of a robotic system in accordance with present systems, devices, articles, and methods, in which information that represents successful completion by a robot of at least one task is generated, and autonomous robot control instructions are generated from the same information, and sensor data.

FIG. 10 illustrates method 1000 executable by a controller, such as circuitry or at least one hardware processor, for operation in a robotic system. Method 1000, describes the generation information that represents the robot successfully completion by a robot of at least one task, and the generation of autonomous robot control instructions from the same information, and sensor data. Those of skill in the art will appreciate that other acts may be included, removed, and/or varied, or performed in a different order, to accommodate alternative implementations. Method 1000 is described as being performed by a controller, for example, a control subsystem or processor(s) in computer system 106 in conjunction with other components, such as, components of system 100. However, method 1000 may be performed by multiple controllers or by another system.

Method 1000 begins, for example, in response to an invocation by the controller. At 1002, the controller initializes a robotic system including a robot. For example, a controller causes a robot (e.g., robot 102-1) to boot and await instructions for operation in autonomous mode.

At 1004, the controller receives a first set of autonomous robot control instructions. The controller may receive a signal containing information that represents the first set of robot control instructions which, when executed, causes the robot operate in autonomous mode. When at least one processor executes the first set of robot control instructions the robot is directed to perform at least one task. The controller may store the autonomous robot control instructions on or within at least one computer- or processor-readable medium.

At 1006, the controller executes the autonomous robot control instructions which causes the robot to perform the at least one task in autonomous mode. The execution of the autonomous robot control instructions may be predicated on sensor data. See, act 1008 below. The controller may execute the autonomous robot control instructions at least once and cause the robot to perform the at least one task in one or more instances. Herein reference to one instance or statements absent of recitation of instance or instances are understood to include one or more instances.

At 1008, the controller receives sensor data from one or more sensors for an environment or for the robot. The sensor data is representative of sensed external and/or internal characteristics that correspond to at least one instance of the robot performing the at least one task. The sensor data can be representative of one or more times during which the task is performed. For example, sensor data may be representative of external and/or internal characteristics sensed or measured at a start of performance of a task, at an end of performance of a task, and/or at one or more times or points between the start and the end of performance of the task. The sensor data includes environmental sensor data and/or internal sensor data. One or more environmental sensors on or proximate to the robot may generate the environmental sensor data for an environment associated with the robot (e.g., robot 102-1). One or more environmental sensors include, for example, scale 206 and camera 214. One or more internal sensors on the robot (e.g., robot 102-1) generate the internal sensor data.

At 1010, the controller generates or derives information that represents successful completion by the robot of the at least one task. The controller derives the information indicative of successful completion of a task from some or all of the sensor data. For example, using machine vision techniques and images from camera 214 the controller can determine if robot 202 placed an item in box 212. Alternatively, when the controller is communicatively coupled to scale 206 the controller can determine an anticipated mass was placed on, or removed from, scale 206. In some implementations, the controller derives the information from some or all of environmental sensor data received from one or more sensor external to the robot (e.g., external, proximate, and in sensor range). The controller may derive the information that represents successful completion by the robot of the at least one task from the sensor data not provided to the robot or a human operator. The sensor data could be from a sensor not on the robot. The sensor data could be from a sensor not in communication with the robot or the operator interface. For example, a sensor in scale 206 (FIG. 2). The sensor that generates the sensor data could have a semi-omnipotent (e.g., birds eye) view or perspective (e.g., field of view, effect range) for example camera 214 (FIG. 2).

At 1012, the controller generated or derives a second set of autonomous robot control instructions from the first set of autonomous robot control instructions, the sensor data, and the information that represents successful completion by the robot of the at least one task. The second set of autonomous robot control instructions, when executed, causes the robot to take the at least one action autonomously. Commonly assigned U.S. patent application Ser. No. 15/051,180 includes descriptions of exemplary derivations of autonomous robot control instructions.

At 1014, the controller derives produces or generates at least one signal that includes information that represents the second set of autonomous robot control instructions. The controller may return the information that represents the second set of autonomous robot control instructions. For example, using the at least one signal the controller may store some or all of the information that represents the second set of autonomous robot control instructions on, or within, at least one nontransitory tangible computer- and processor-readable storage media. For example, the controller sends the at least one signal over a network.

Method 1000 ends until invoked again. Method 1000 may be invoked by a local agent or a remote agent.

FIG. 11 is a schematic diagram illustrating a data structure 1100 for use in operation of a robotic system. In methods 700, 800, 900, and 1000 a controller may generate or derive further autonomous robot control instructions or the like. The controller may make use of one or more data structures. Data structure 1100 is an exemplary data structure, a table. Data structure 1100 includes processor-readable data or information. A controller may access data structure 1100 on or within at least one nontransitory or tangible computer- or processor-readable storage medium.

Data structure 1100 includes a header row with fields 1102, 1104, and so on. A trace field 1102 denotes the trace identifier (e.g., trace number). Each trace produced by a robotic system may be uniquely identified by a unique trace identifier (e.g., a trace number) and stored in a trace field 1102. A trace identifier can be used as a relational key for data structure 1100. A robot control instruction identifier field 1104 stores robot control instruction identifiers, references, or pointers for a set of control instructions associated with a given trace. The controller may label each set of robot control instructions with a respective robot control instruction identifier. The robot control instruction identifier field 1104 may facilitate a controller retrieving robot control instructions. Robot control instructions can be piloted or autonomous types. A type field 1106 stores a flag or other value that represents a type (e.g., at least the piloted type, and autonomous types) of the robot instructions associated with a given trace.

In some implementations, data structure 1100 includes one or more sensor data fields 1108 for sensor data. Sensor data associated with a robot may be stored in the sensor data field 1108 and assigned a unique sensor data identifier, reference, or pointer for or to the sensor data associated with a given trace. One task can have more than one set of robot control instructions associated with it. A task identifier for a task can be stored in a task identifier field 1110 of the data structure 1100 for a respective task associated with a given trace. In some implementations, a success field 1112 of the data structure 1100 stores a flag or other value that is representative of whether a respective task for a given trace was successful or not. Each trace can be associated with a successful completion of a task. Successful completion of a task for a trace can be recorded as a Boolean or the like in association with the trace in the success field 1112.

Data structure 1100 can include one or more rows of data associated with one or more traces. For example, row 1151 is associated with a first trace T1021. The first trace T1021 is associated with a set of automated robot control instructions. A second trace T1022 in row 1152 is associated with the same set of automated robot control instructions. The task is the same for the two rows, but need not be. As illustrated data structure 1100 includes row 1153 associated with a third trace, for piloted robot control instructions. As illustrated data structure 1100 includes row 1154 associated with a fourth trace, T1024, for automated robot control instructions.

Figure 12:
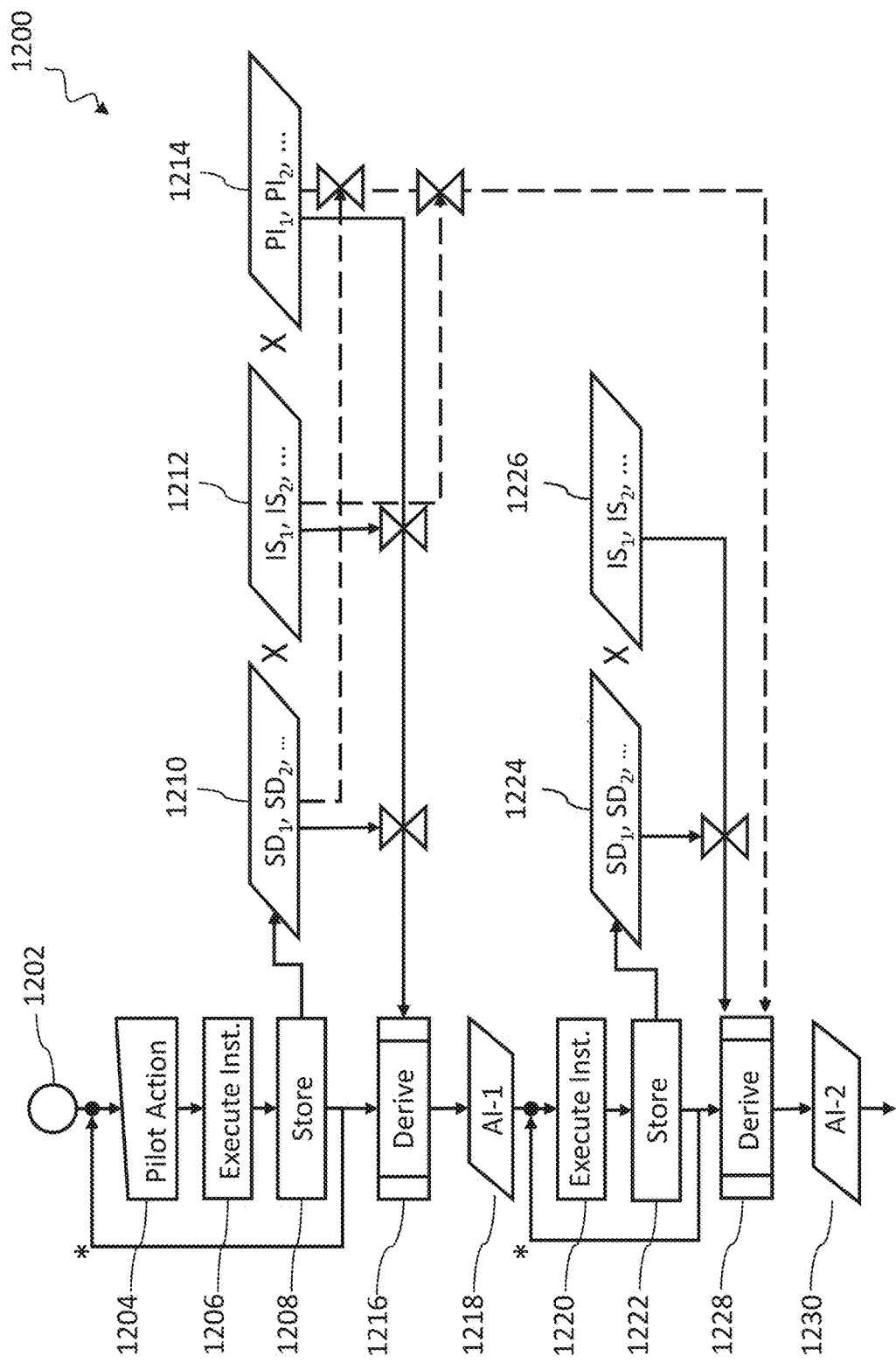
FIG. 12 is a flowchart illustrating methods of operation of a robotic system in accordance with present systems, devices, articles, and methods, in which autonomous robot control instructions are generated or produced.

FIG. 12 illustrates a method 1200, parts of which are executable by a controller, such as circuitry or at least one hardware processor, for operation in a robotic system that includes an operator interface. Method 1200 illustrates the generation or production of autonomous robot control instructions. Those of skill in the art will appreciate that other acts may be included, removed, and/or varied, or performed in a different order, to accommodate alternative implementations. The method 1200 is described as being performed, in part, by a controller, for example, a control subsystem or processor(s) in computer system 106 in conjunction with other components, such as, components of system 100; and by a human operator. However, the processor executable parts of method 1200 may be performed by multiple controllers or by another system.

Method 1200 begins at 1202, for example, in response to an invocation by the controller. The controller initializes a robotic system including an operator interface and a robot. For example, a controller causes a robot (e.g., robot 102-1) to boot and await instructions from a human operator at an operator interface, such as, interface 104.

At 1204, the controller receives a first instance of piloted robot control instructions (pilot action) from the operator interface. The first instance of piloted robot control instructions may be denoted with a temporal index that represents an instance, e.g., a subscript, such as, $PI_1$. At 1206, the controller executes the first instance of piloted robot control instructions. When the controller executes the first instance of piloted robot control instructions the robot is directed to simulate or replicate one or more actions taken by the human operator at the operator interface. The actions can be part of one or more tasks.

At 1208, the controller then stores or records, at least two of the following sets of data. The controller may store or record in data frame or record 1210, sensor data associated with the first instance of piloted robot control instructions. The sensor data associated with the first instance of piloted robot control instructions may be denoted $SD_1$. The controller may record in data frame 1212, information that represents success of the robot at the at least one task when executing the first instance of piloted robot control instructions, $IS_1$. The controller may record in data frame 1214 the first instance of piloted robot control instructions, $IS_1$.

The acts 1204, 1206, and 1208 may be performed one or more times. Each repetition of acts 1204, 1206, and/or 1208 creates a further instance of piloted robot control instructions, information that represents success of the robot, and sensor data. For example, $SD_2$, $IS_2$, and/or $PI_2$.

After a determined number of iterations, the controller executes processor executable instructions at 1216, that define a set procedure to derive a first set of autonomous control instructions. The controller receives the one or more instances of the piloted robot control instructions, the sensor data, and information that represents success of the robot. These may be collated by time index, e.g., $SD_2$, $IS_2$, $PI_2$; $SD_3$, $IS_3$, and $PI_3$; and the like. The controller may store or record the first set of autonomous control instructions in data frame 1218. The first set of autonomous control instructions may be denoted AI-1.

At 1220, the controller executes the first set of autonomous control instructions, AI-1 one or more times. That is, there is one or more instances of the robot performing at least one task. At 1222, the controller then records, or receives and records, sensor data associated with one or more instance of execution of the first set of robot control instructions. The controller may record the sensor data in data frame 1224. The controller then records or receives and records success information associated with the first instance of the execution of the first set of robot control instructions. The controller may record the success information in data frame 1226.

After a determined number of iterations, the controller executes processor executable instructions at 1228, that define a set procedure to derive a second set of autonomous control instructions. The second set of autonomous control instructions is based on at least the first set of autonomous control instructions, AI-1; the associated sensor data in data frame 1224, e.g., $SD_1$, $SD_2$; and the success information in data frame 1226, e.g., $IS_1$, $IS_2$. The controller may collate sensor data included in data frame 1224, and the success information included in data frame 1226. In some implementations, the second set of autonomous control instructions is based on at least: the first set of autonomous control instructions, AI-1; the associated sensor data included in data frame 1224; the success information included in data frame 1226; one or more instances of piloted robot control instructions included in data frame 1214; associated sensor data included in data frame 1210; and associated success information included in data frame 1212. In some implementations, the controller may generated the second set of autonomous control instructions by selecting samples from: the first set of autonomous control instructions, AI-1 with associated sensor data included in data frame 1224, and associated success information included in data frame 1226; and the piloted robot control instructions included in data frame 1214 with associated sensor data included in data frame 1210 and associated success information include in data frame 1212.

The controller may record or store the second set of autonomous control instructions in data frame 1230. The second set of autonomous control instructions may be denoted AI-2.

Figure 13:
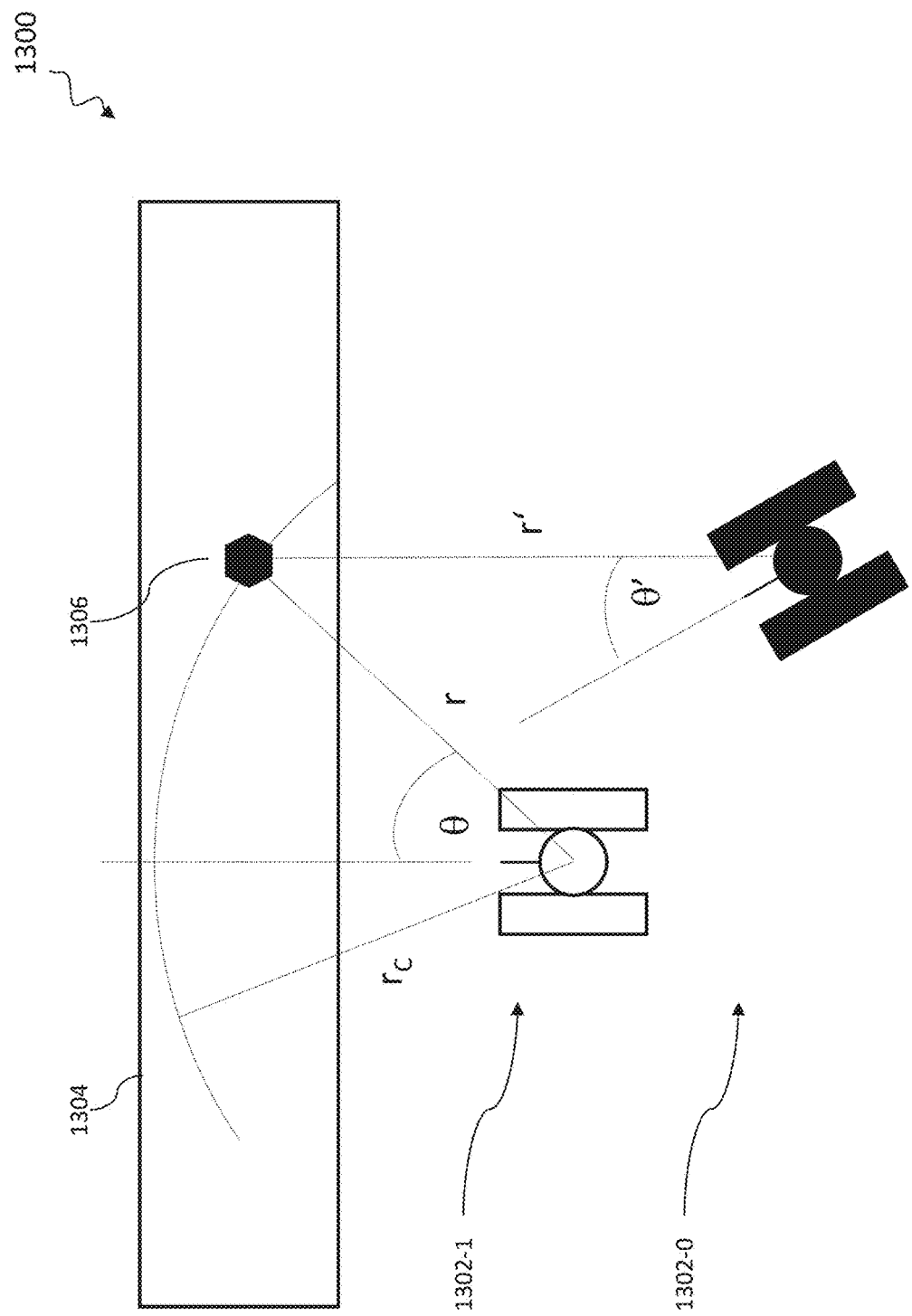
FIG. 13 is a plan view illustrating a portion of an environment including a robot and an item.
Figure 14:
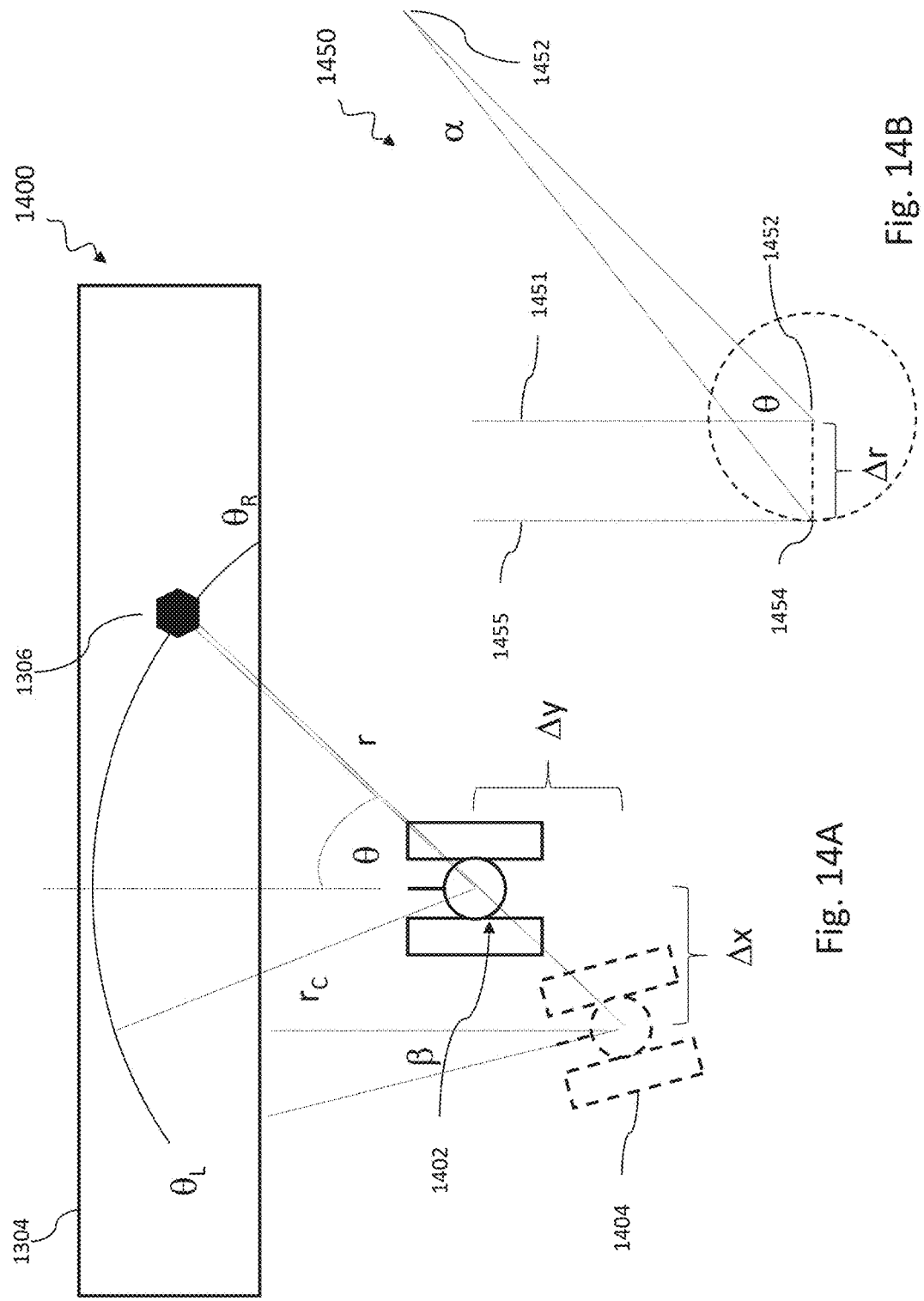
FIG. 14A is a plan view illustrating a portion of the environment from FIG. 13 including a robot and an item in an environment.
FIG. 14B is a schematic view illustrating aspects the relative position of a robot and an item.

FIG. 13 illustrates a portion of an environment 1300 including a robot 1302. Robot 1302 may operate in many environments. Environment 1300 includes an object, workpiece, or item 1304, and a workbench 1306. Robot 1302 may be in position 1308 relative to item 1304. Position 1308 can be an initial run-time position or general pose of robot 1302. That is an initial position with respect to acts described herein but may follow other acts including acts described herein. Robot 1302 may have access to, e.g., control subsystem in robot 1302 may be in communication with, a data storage device, e.g., nontransitory tangible computer- and processor-readable storage devices 110, that includes one or more sets of robot control instructions. The one or more sets of robot control instructions can be executed to perform at least one task. The robot 1302 in autonomous mode may replay or execute one or more sets of piloted control instructions to perform at least one task. The robot 1302 in autonomous mode may execute one or more sets of autonomous control instructions to perform at least one task.

In various implementations, each set of robot control instructions has an associated first, start, or ready positon. An example of a first position is position 1310. Robot 1302 may acquire (e.g., receive or generate) a run-time position (e.g., position 1308) for robot 1302. For example, a relative position for robot 1302 with respect to item 1304. Robot 1302, or a control subsystem included therein, can search for, or look-up, a set of robot control instructions that, when executed or replayed, cause robot 1302 to interact with item 1304 and perform at least one task. Robot 1302, or a control subsystem therein, can search for a set of robot control instructions via the run-time position (e.g., position 1308) as a key. In some implementations, the robot may select a set of piloted control instructions associated with position 1310, a first position. The controller may select the start position given proximity to the run-time position, e.g., position 1308. See, herein at, at least, FIGS. 15 and 16, and associated descriptions. In some implementations, the robot, or a computer system, may select a set of autonomous control instructions associated with position 1310, a first position. See, herein at, at least, FIG. 17, and associated descriptions.

Robot 1302 may select a first position, given a run-time position, by a measure or metric of closeness. For example, minimum distance (e.g., Euclidean norm), minimum Manhattan distance, weighted minimum distance (e.g., weighted Euclidean norm). Robot 1302 may select a first position, given a run-time position, via a cosine measure of closeness.

Robot 1302, or a control subsystem, could cause robot 1302 to move from position 1308 to position 1310. Robot 1302, at position 1308, could have a distance or range r' from itself to item 1304. Robot 1302, at position 1308, could have a direction, θ', from itself to item 1304, e.g., angle off median or sagittal plane of robot 1302. Robot 1302, at position 1310, could have a distance r from itself to item 1304. Robot 1302, at position 1310, could have a direction, θ, from itself to item 1304. Before executing the piloted control instructions, robot 1302 could reposition from position 1308 to position 1310. Position 1308 is an example of a run-time position and position 1310 is a first position.

FIG. 14A illustrates a portion of an environment 1400 including robot 1302, item 1304, and workbench 1306. Robot 1302 may be in a position 1402. Position 1402 may be a relative position (e.g., distance and direction) with respect to item 1304.

Robot 1302 may have an error in its position. For example, robot 1302 have intended to move under (preliminary) robot control instructions to position 1402. However, robot 1302 may occupy a realized or actual position 1404. The error in position can be broken down into components such as: error in range Δr and error in angle Δθ; and error in a first direction Δx and error in a second direction Δy. The error in position can be expressed as Δx=Δr sin(θ) and Δy=Δr cos(θ). The error in angle is a function of two sources Δθ=Δθ(α, β). Here α is an angle introduced by position error and β is the strafing error. Strafing error is the tolerance to which a robot can turn in place and point. FIG. 14B illustrates the angle introduced by position error.

FIG. 14B illustrates a schematic 1450 including an axis 1451, an intended position 1452 (e.g., range and angle), and a realized or actual position 1454. The difference in intended position 1452 and realized position 1454 creates an error in angle θ from axis 1451 to item 1456. The axis 1451 can lie in the median or sagittal plane of a robot. The angle α is an angle introduced by position error. The angle α is combined with angle of the intended position 1452, θ, to get the direction to item 1456 from the realized position 1454. For example, the item could lie in a direction θ+α off axis 1457. Axis 1457 is can lie in the median or sagittal plane of a robot in its realized position 1454. Here axis 1457 is illustrated without strafing error, β. The angle α, angle introduced by position error, is maximal when the displacement from intended position 1452 to realized position 1454 is at right-angles (i.e., orthogonal) to line segment between positions 1452 and 1454. This can be expressed as:

$$\alpha \leq \tan^{-1}\frac{\Delta r}{r}$$

The error in angle can inform the selection of a set of robot control instructions. For example, some robot control instructions may have a specified precision the robot may need to achieve before replaying certain robot control instructions.

Figure 15:
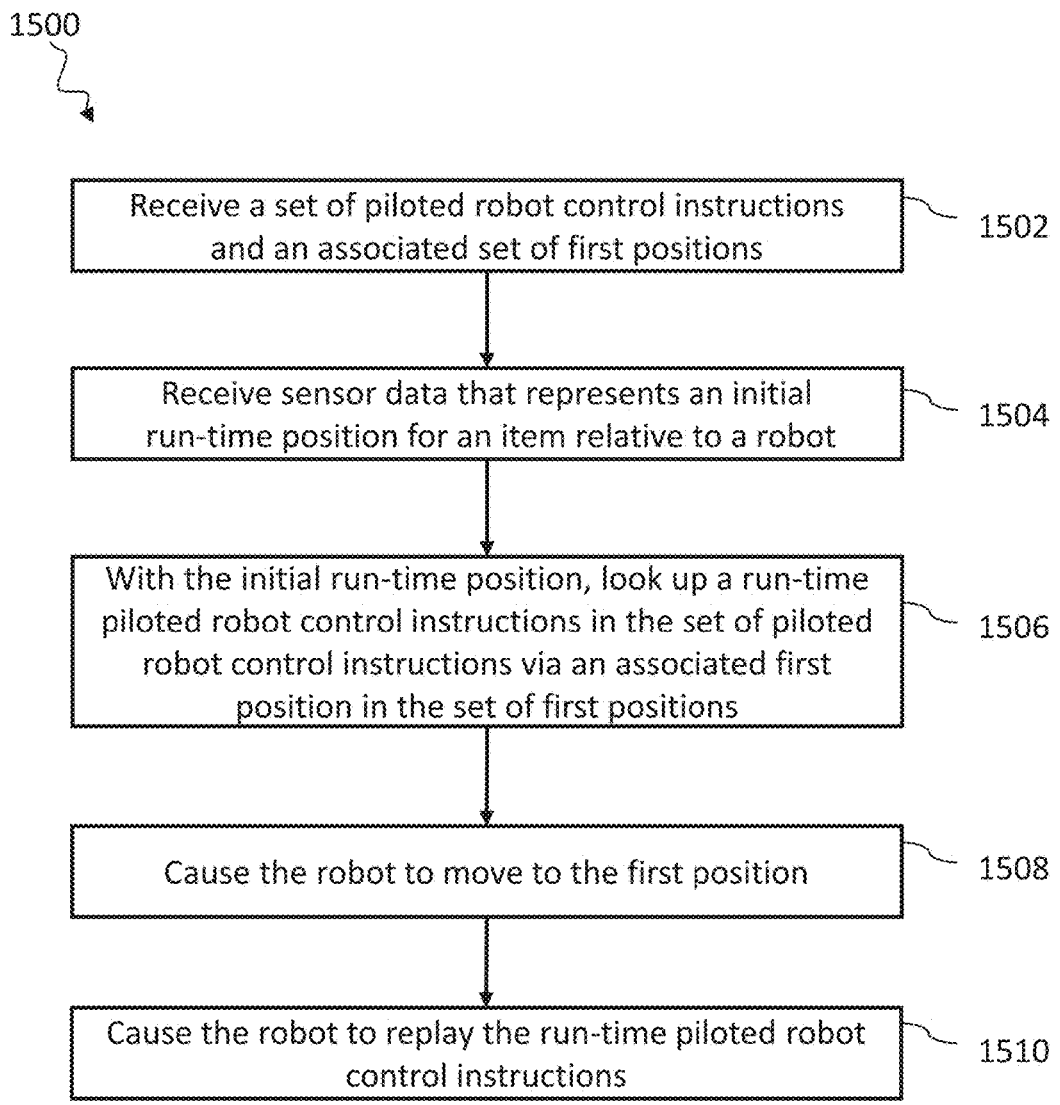
FIG. 15 is a flowchart illustrating methods of operation of a robotic system.

FIG. 15 illustrates method 1500 executable by a controller, such as circuitry or at least one hardware processor, for operation in a robotic system. Method 1500 describes the selection of piloted control instructions and the execution of the same by a robot. Those of skill in the art will appreciate that other acts may be included, removed, and/or varied, or performed in a different order, to accommodate alternative implementations. Method 1500 is described as being performed by a controller, for example, a control subsystem or at least one processor in a robot (e.g., control subsystem 303 in robot 300) in conjunction with other components, such as, components of system 100. However, method 1500 may be performed by multiple controllers or by another system.

Prior to acts shown in method 1500 the controller could initialize a robotic system including a robot. The controller could cause or direct a robot (e.g., robot 1302) to boot (e.g., load and execute processor-readable instructions, such as, operating system, driver(s), and communication instructions and data) and await instructions for operation in autonomous mode.

Method 1500 begins, for example, in response to an invocation by the controller. At 1502, the controller receives piloted robot control instructions. As well, at 1502, the controller receives a plurality of first positions.

The controller receives a plurality of sets of robot control instructions. Each set of robot control instructions, in the plurality of sets of robot control instructions, when executed, causes the robot to perform at least one task. Each set of robot control instructions includes one or more instructions. Each set of robot control instructions may be piloted robot control instructions. For example, the controller may receive the plurality of sets of robot control instructions from an operator interface in communication with the controller or controller and robot. The controller may receive a signal including information that represents the plurality of sets of robot control instructions.

At 1502, the controller also receives a plurality of first positions. Each first position in the plurality of first positions is associated with a set of robot control instructions in the plurality of sets of robot control instructions. Each first position in the plurality of first positions is a location, place, or point a robot should be in to replay a set of robot control instructions. The plurality of first positions may be called a plurality or set of associated first positions. The controller may receive a signal including information that represents the plurality of first positions.

At 1504, the controller receives sensor data, from one or more sensors, that represents an initial run-time position for an item, the robot, or robot-item pair. The initial run-time position for the item may be a position of the item relative to the robot. The controller may receive the initial run-time position for the item from an input subsystem of the robot.

At 1506, the controller look-ups, or searches for, run-time piloted robot control instructions. The controller uses the initial run-time for the item as the basis of the query. The controller uses the associated first positions for each piloted robot control instructions. That is, the plurality of first positions is a key for the robot control instructions. The controller can look up the position in the plurality of first positions that is closest to the initial run-time position. In some implementations the controller searches for a set of run-time robot control instructions from within a plurality of sets of robot control instructions, based on an association between the initial run-time position and a first position in a plurality of first positions. The first position is associated with the first set of run-time robot control instructions.

At 1508, the controller, as needed, causes the robot to move to the associated first positions for the robot control instructions found in act 1506. For example, the controller produces or makes a preliminary or prefatory set of run-time robot control instructions which when executed causes the robot to move to the first position associated with the robot control instructions. The controller can then cause the robot to execute the preliminary set of run-time robot control instructions.

At 1510, the controller causes the robot to replay or execute the run-time piloted robot control instructions. That is, when a robot is in a first position it can replay the piloted robot control instructions.

In method 1500 the controller may derive, produce, or generate at least one signal that includes information that represents the preliminary set of run-time robot control instructions or associated first position. The controller may return the information. For example, using the at least one signal the controller may store some or all of the information on, or within, at least one nontransitory tangible computer- and processor-readable storage media. For example, the controller may send the at least one signal through a communication channel.

In method 1500 the controller may derive, produce, or generate at least one signal that includes information that represents the run-time piloted robot control instructions. The controller may return the information that represents the run-time piloted robot control instructions. For example, using the at least one signal the controller may store some or all of the information that represents the run-time piloted robot control instructions on, or within, at least one non-transitory tangible computer- and processor-readable storage media. For example, the controller may send the at least one signal through a communication channel.

In method 1500 the controller may receive or process different types of positions, e.g., first position, and run-time position. A position can be a location, or place, in an environment, or a pose or configuration of robot limbs (e.g., angles for servos). A position can be an absolute or a relative position, e.g., relative to an item. See, at least, teachings and disclosures related to method 1600 herein below which are applicable to methods 1500 and 1700 (herein below) as and with appropriate changes.

Method 1500 ends until invoked again. Method 1500 may be invoked by a local agent or a remote agent.

Figure 16:
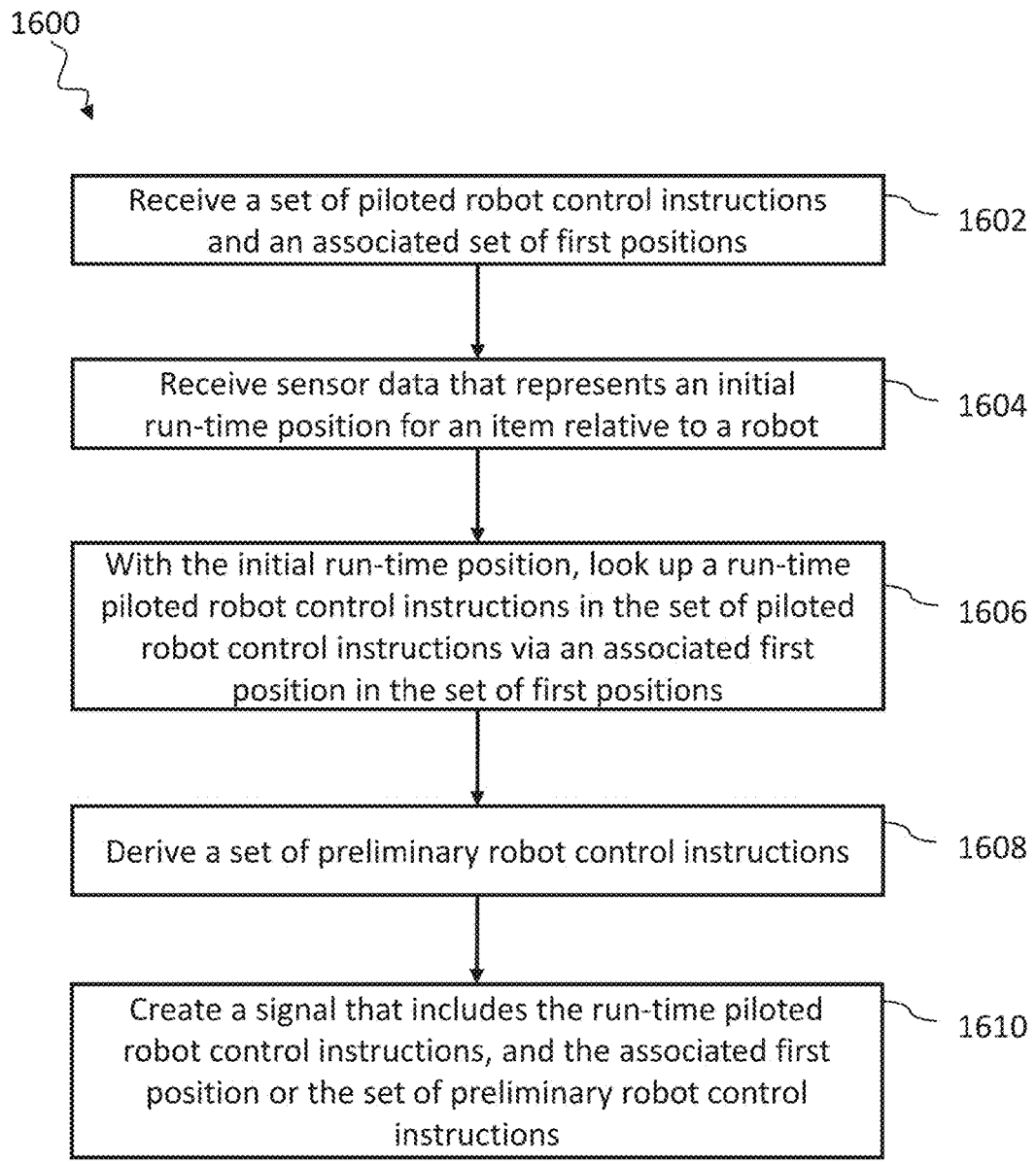
FIG. 16 is a flowchart illustrating methods of operation of a robotic system in accordance with present systems, devices, articles, and methods, in which robot control instructions are selected.

FIG. 16 illustrates method 1600 executable by a controller, such as circuitry or at least one hardware processor, for operation in a robotic system. Method 1600 describes the generation information that represents at least a first position for a robot to assume before starting the replay of piloted control instructions. Those of skill in the art will appreciate that other acts may be included, removed, and/or varied, or performed in a different order, to accommodate alternative implementations. Method 1600 is described as being performed by a controller, for example, a control subsystem or processor(s) in computer system 106 in conjunction with other components, such as, components of system 100.

However, method 1600 may be performed by multiple controllers or by another system.

Prior to acts shown in method 1600 the controller could initialize a processor based computer system, including an associated communications subsystem, and await for communication. For example, a computer system, such as computer system 106, may include a communications subsystem in communication with a communication channel. The controller may use the communication channel to send (and receive) signals including information to (and from) a robot.

Method 1600 begins, for example, in response to an invocation by the controller. At 1602, the controller receives a plurality of sets of robot control instructions. The controller may receive at least one signal over a communication channel that includes information representing the plurality of sets of robot control instructions. Each set of robot control instructions, in the plurality of sets of robot control instructions, when executed, causes the robot to perform at least one task.

As well, at 1602, the controller receives a plurality of associated first positions. The controller may receive at least one signal over a communication channel that includes information representing the associated set of first positions. Each first position in the plurality of associated first positions is associated with a set of robot control instructions in the plurality of sets of robot control instructions. The association can be 1:1 or otherwise. Each first position can be a location or place in an environment, or a pose or configuration of robot limbs (e.g., angles for servos). Limbs includes arms, legs, hands, and head. The term position encompasses both location or place, on one hand, and pose or configuration, on the other.

At 1604, the controller receives sensor data that represents an initial run-time position for an item, the robot, or robot-item pair. The initial run-time position for the item may be a position of the item relative to the robot or a part of the robot. The controller may receive the initial run-time position for the item over a communication channel from an input subsystem of the robot.

At 1606, the controller look-ups run-time piloted robot control instructions. The controller uses the initial run-time for the item as the basis of, or key for, the query. The controller uses the associated first positions for each piloted robot control instructions. That is, the plurality of first positions is a key for looking up robot control instructions. The controller can look up the position in the plurality of first positions that is closest to the initial run-time position.

At 1608, the controller produces or makes a set of preliminary or prefatory run-time robot control instructions which when executed causes the robot to move to the first position associated with the robot control instructions. For example, the set of preliminary run-time robot control instructions could, when executed, direct a robot to move to a location in an environment. The robot could make use of a locomotion subsystem to move. As well, the set of preliminary run-time robot control instructions could, when executed, direct a robot to change positions on servos and drive limbs into a first position. The robot could make use of a manipulation subsystem to change servo positions, e.g., end-effector 154 for robots 102.

At 1610 the controller derives, produces, or generates at least one signal that includes information that represents the run-time piloted robot control instructions, and the associated first position or the set of preliminary run-time robot control instructions. In some implementations, the information represents the run-time piloted robot control instructions, and the associated first position. In some implementations, the information represents the run-time piloted robot control instructions, and the set of preliminary run-time robot control instructions. The controller may return the information. With the at least one signal the controller may store some or all of the information on, or within, at least one nontransitory tangible computer- and processor-readable storage media. The controller may send the at least one signal including the information through a communication channel. For example, the controller may send the information to robot 102-1 across communication channel 108.

A robot can receive the associated first position (to the run-time piloted robot control instructions) and create or derive a set of preliminary run-time robot control instructions, and then execute the same. A robot can receive and execute the set of preliminary run-time robot control instructions. A robot can receive and execute, or replay, the run-time piloted robot control instructions. Method 1600 ends until invoked again. Method 1600 may be invoked by a local agent or a remote agent.

Figure 17:
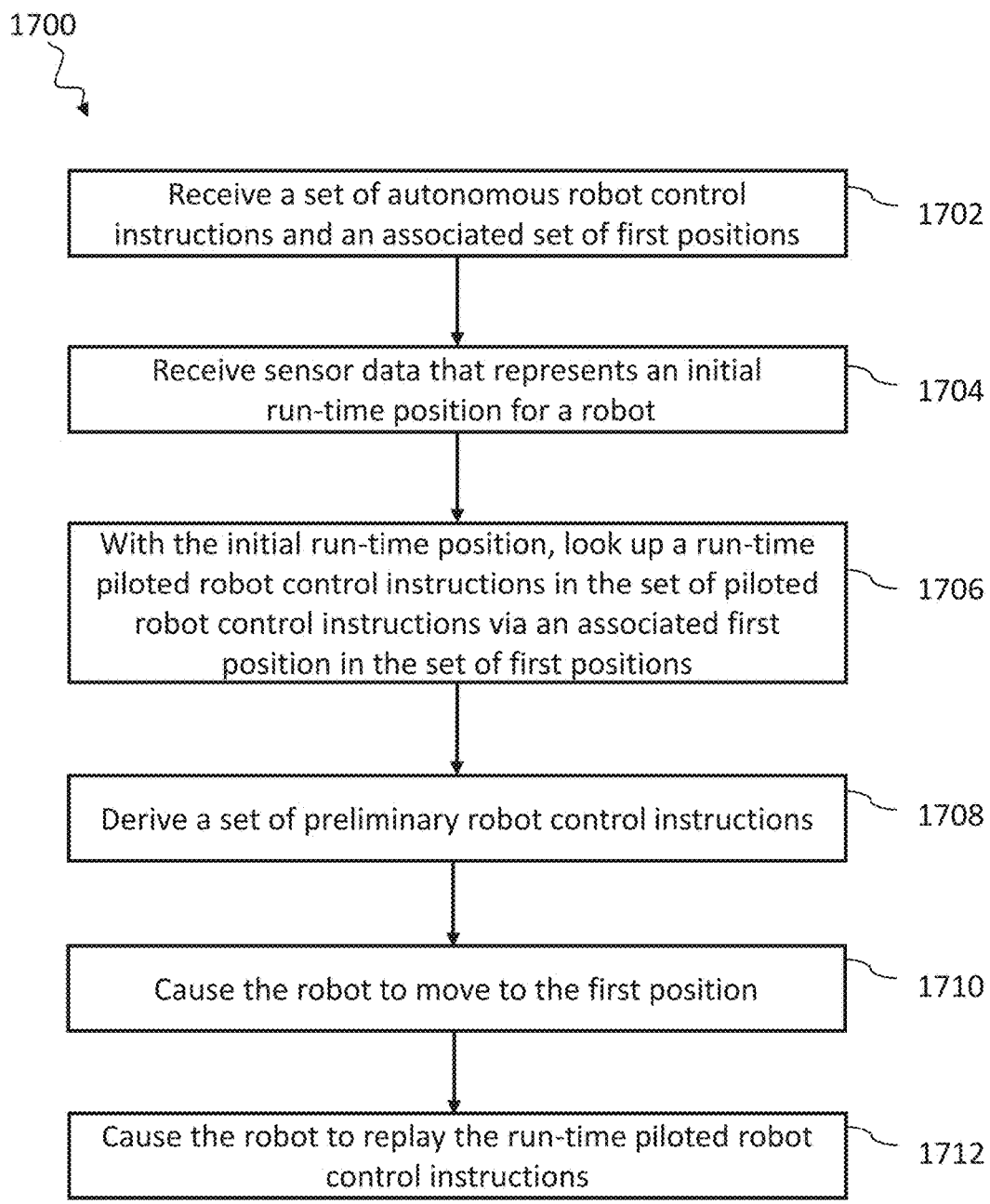
FIG. 17 is a flowchart illustrating methods of operation of a robotic system in accordance with present systems, devices, articles, and methods, in which autonomous robot control instructions are selected and executed.

FIG. 17 illustrates method 1700 executable by a controller, such as circuitry or at least one hardware processor, for operation in a robotic system. Method 1700, describes the selection of autonomous control instructions and the execution of the same by a robot. Those of skill in the art will appreciate that other acts may be included, removed, and/or varied, or performed in a different order, to accommodate alternative implementations. Method 1700 is described as being performed by a controller, for example, a control subsystem or at least one processor in a robot (e.g., control subsystem 303 in robot 300) in conjunction with other components, such as, components of system 100, e.g., camera 156, microphone 158, and communication channel 108. However, method 1700 may be performed by multiple controllers or by another system.

Prior to acts shown in method 1700 the controller could initialize a robotic system including a robot. The controller could cause or direct a robot (e.g., robot 202) to boot and await instructions for operation in autonomous mode.

Method 1700 begins, for example, in response to an invocation by the controller. At 1702, the controller receives autonomous robot control instructions. As well, at 1702, the controller receives a plurality of first positions.

The controller receives a plurality of sets of robot control instructions. Each set of robot control instructions, in the plurality of sets of robot control instructions, when executed, causes the robot to perform at least one task. Each set of robot control instructions includes one or more instructions. Each set of robot control instructions may be autonomous robot control instructions. For example, the controller may receive the plurality of sets of robot control instructions from a computer system. The controller may receive a signal including information that represents the plurality of sets of robot control instructions.

Each set of autonomous robot control instructions in the plurality of sets of robot control instructions may be associated with a first position. In operation, a start from the first position may be beneficial to success of the robot to perform at least one task. The first position associated with a set of autonomous robot control instructions may be an averaged position. That is, the first position is an average (e.g., mean, median, mode) of a plurality of first positions associated with a plurality of piloted robot control instructions used to create the set of autonomous robot control instructions.

At 1702, the controller also receives a plurality of first positions. Each first position in the plurality of first positions is associated with a set of autonomous robot control instructions in the plurality of sets of robot control instructions.

Each first position in the plurality of first positions is a location or point a robot should be in to execute a set of robot control instructions. The controller may receive a signal including information that represents the plurality of first positions.

At 1704, the controller receives sensor data, from one or more sensors and optionally via an input subsystem, that represents an initial run-time position for an item, the robot, or robot-item pair. The initial run-time position for the item may be a position of the item relative to the robot. The initial run-time position for the robot may be a position of the robot relative to the item.

At 1706, the controller look-ups, or searches for, a set of run-time autonomous robot control instructions. The controller uses the initial run-time position for the item as the basis of the query. The set of run-time autonomous robot control instructions may be labeled as a first set of run-time robot control instructions.

At 1708, the controller produces or makes a set of preliminary or prefatory run-time robot control instructions which when executed causes the robot to move to the first position associated with the autonomous robot control instructions. For example, the set of preliminary run-time robot control instructions could, when executed, direct a robot to move to a location in an environment. The robot could make use of a locomotion subsystem to move. As well, the set of preliminary run-time robot control instructions could, when executed, direct a robot to change positions on servos and drive limbs into a first position. The robot could make use of a manipulation subsystem to change servo positions. The set of preliminary run-time robot control instructions may be labeled as a second set of run-time robot control instructions.

At 1710, the controller, as needed, causes the robot to move to the associated first position for the robot control instructions found in act 1706. For example, the controller causes the robot to execute the set of preliminary run-time robot control instructions. The robot could move to a location or a pose included in the first position.

At 1712, the controller, cause the robot to execute the run-time autonomous robot control instructions. That is, when a robot is in a first position it can execute the autonomous robot control instructions and perform at least one task.

In alternative implementations, the controller can derive, produce, or generate at least one signal that includes information that represents the run-time autonomous robot control instructions, and the associated first position or the set of preliminary run-time robot control instructions. In some implementations, the information represents the run-time autonomous robot control instructions, and the associated first position. In some implementations, the information represents the run-time autonomous robot control instructions, and the set of preliminary run-time robot control instructions. The controller may return the information. With the at least one signal the controller may store some or all of the information on, or within, at least one nontransitory tangible computer- and processor-readable storage media. The controller may send the at least one signal including the information through a communication channel.

FIG. 18 is a schematic diagram illustrating a data structure 1800 for use in operation of a robotic system. In at least, methods 1500, 1600, and 1700, a controller may select robot control instructions, or the like. The controller may make use of (e.g., create, update, and access) one or more data structures. Data structure 1800 is an exemplary data structure, illustrated as a table, but can take other forms, for example records with fields, or a linked list, etc. Data structure 1800 includes processor-readable data or information including information that associates poses with robot control instructions. A controller may create, access, or update data structure 1800 on or within at least one non-transitory or tangible computer- or processor-readable storage medium.

Data structure 1800 includes a header row with fields 1802, 1804, 1806, 1808. An index field 1802 denotes an identifier (e.g., row number). Each entry in data structure 1800 may be uniquely identified by a unique identified and stored in index field 1802. Index field 1802, can in some implementations, be used as a relational key for data structure 1800.

A robot first pose identifier field 1804 stores a first pose, or a reference or pointer to the same, for an identifier to a set of robot control instructions. The controller may label each set of robot control instructions with a respective first pose identifier. Robot first pose identifier field 1804, can in some implementations, be used to find one or more associated sets of robot control instructions or robot control instructions identifiers.

The controller may label each set of robot control instructions with a respective robot control instruction identifier. The robot control instruction identifier field 1806 may facilitate a controller to retrieve robot control instructions. Robot control instruction identifier field 1806 stores a set of robot control instructions, or a reference or pointer to the same. Robot control instructions can be piloted or autonomous types. A type field 1808 stores a flag or other value that represents a type (e.g., at least the piloted type, and autonomous types) of the robot instructions.

Data structure 1800 can include one or more rows of data associated with one or more sets of robot control instructions. For example, row 1851 is associated with a set of piloted control instructions, C819098. Rows 1852 and 1854 are associated with a piloted control instructions. Row 1853 of data structure 1800 is associated with a set of autonomous control instructions. Rows 1853 and 1854 are associated with the same first pose, P60312.

Figure 19:
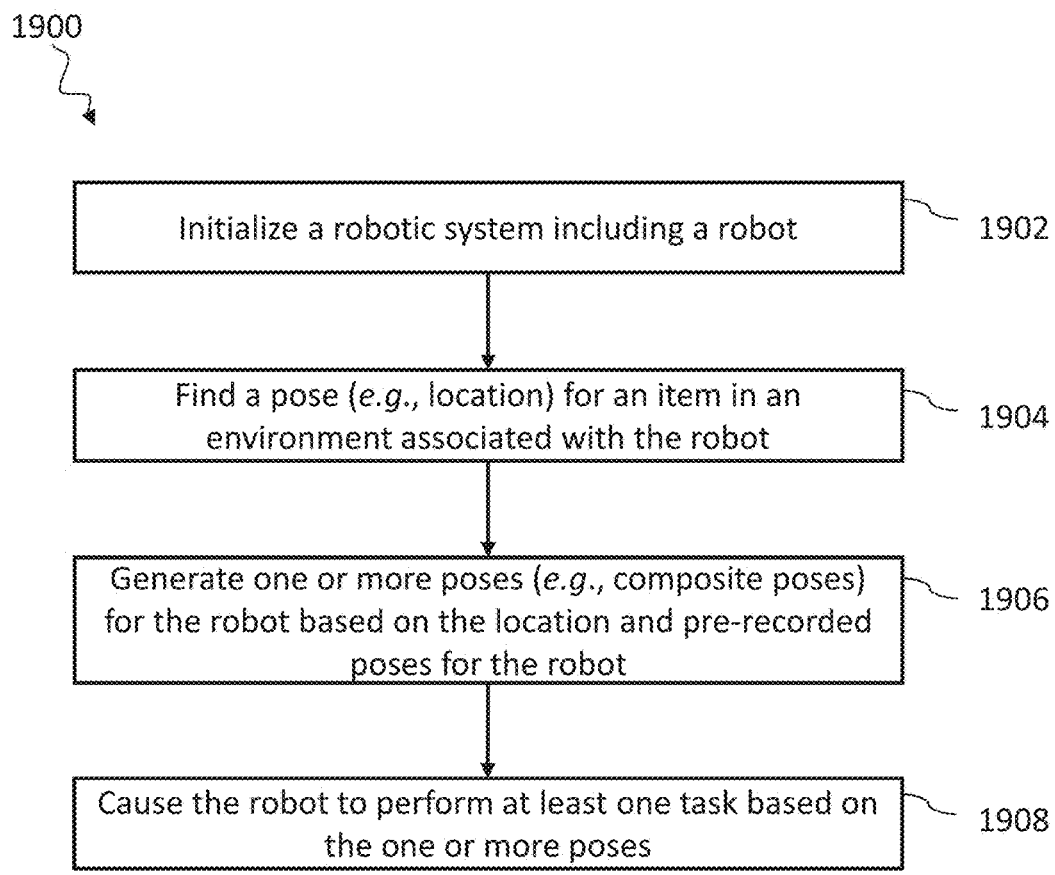
FIG. 19 is a flowchart illustrating methods of operation of a robotic system in accordance with present systems, devices, articles, and methods, in which robot control instructions are defined and executed in view of sensor data.

FIG. 19 illustrates method 1900 executable by a controller, such as circuitry or at least one hardware processor, for operation in a robotic system. Method 1900, describes the derivation, and execution, of autonomous control instructions for a robot to perform at least one task. Those of skill in the art will appreciate that other acts may be included, removed, and/or varied, or performed in a different order, to accommodate alternative implementations. Method 1900 is described as being performed by a controller, for example, a control subsystem or at least one processor in a robot (e.g., control subsystem 303 in robot 300) in conjunction with other components, such as, cameras or other imagers 320, input subsystem 312, propulsion subsystem 316, manipulation subsystem 318, and the like. However, multiple controllers, another system, or the like, may perform method 1900.

Method 1900 begins, for example, in response to an invocation by the controller. At 1902, the controller could initialize a robotic system including a robot. The controller could cause or direct a robot (e.g., robot 300) to boot (i.e., prepare for operation, e.g., load operating system instructions to RAM), assume a pose, and await sensor data from one or more sensors (e.g., via input subsystem 312). At 1904, the controller acquires (e.g., receives, finds, calculates) a pose (e.g., position or posture) for an item or object in an environment associated with the robot. Methods a controller may use to find a pose for an item are described herein at least at FIG. 20.

At 1906, the controller generates, derives, or produces one or more composite poses for the robot given, or based on, the pose of the item. For example, the controller produces a composite pose from a set of pre-recorded poses or primitive poses (e.g., a plurality of pre-recorded poses) for the robot. Each pose in the set of pre-recorded poses for the robot may be associated with a set of robot control instructions (e.g., piloted robot control instructions). See description of generation of one or more composite poses (e.g., grasp poses) herein at, at least, FIG. 21.

At 1908, the controller causes the robot to perform at least one task based on the composite poses. For example, the at least one task may include causing a robot to grasp the item and the one or more composite poses may be a rest pose, or pre-, mid-, or post-grasp pose. The controller may create trajectories to, from, or between composite robots for a robot to follow. The robot may perform the at least one task by executing autonomous robot control instructions which are based on the one or more composite poses. Robots that execute processor readable instructions are described herein. Additionally or alternatively to act 1908, the controller creates, generates, or produces a signal that includes information that specifies or represents the composite pose.

Figure 20:
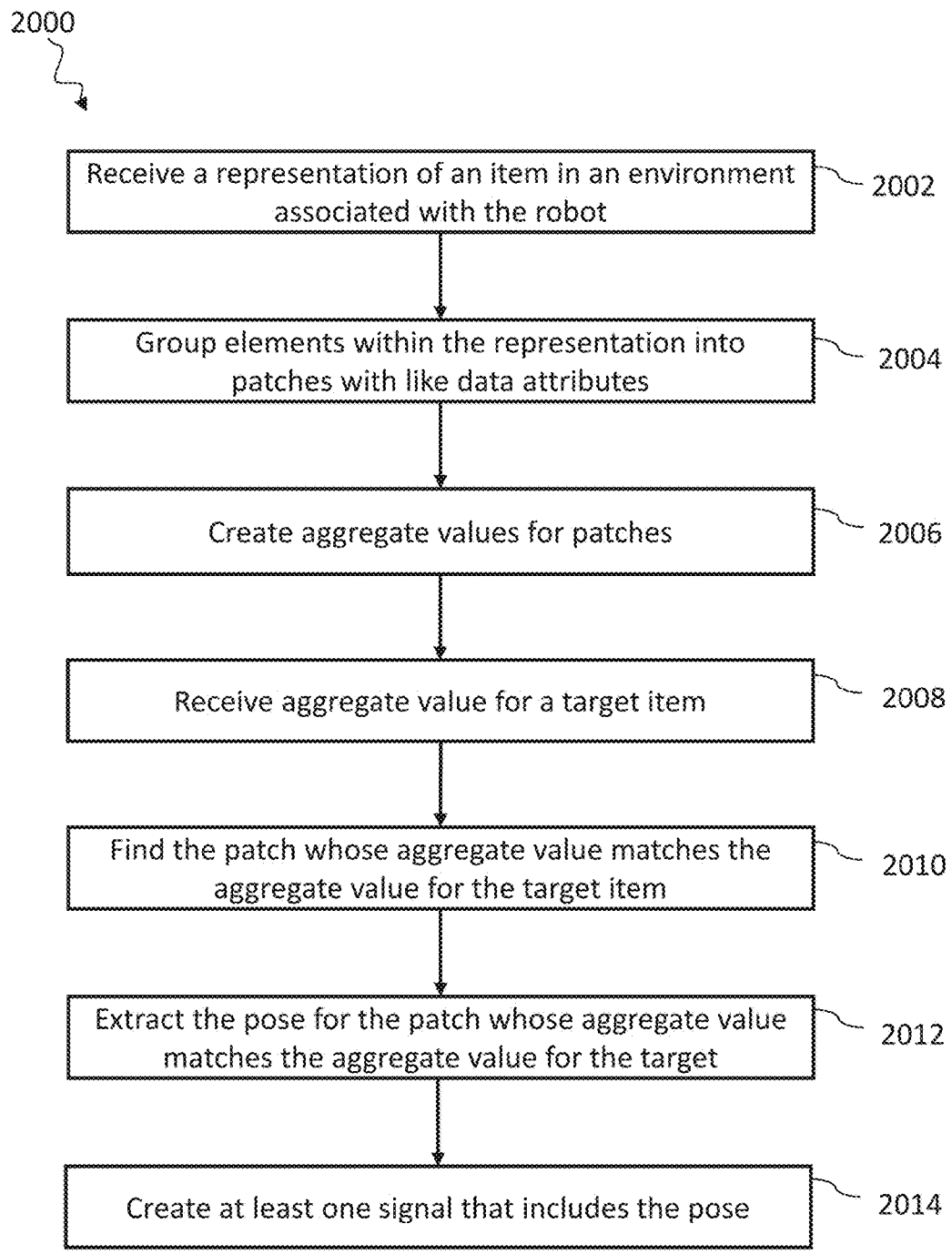
FIG. 20 is a flowchart illustrating methods of operation of a robotic system in accordance with present systems, devices, articles, and methods, in which a position of an item is determined from sensor data.

FIG. 20 illustrates method 2000 executable by a controller, such as circuitry or at least one hardware processor, for operation in a robotic system. Method 2000, describes a derivation of a pose (e.g., relative position) for an item. Those of skill in the art will appreciate that other acts may be included, removed, and/or varied, or performed in a different order, to accommodate alternative implementations. Method 2000 is described as being performed by a controller, for example, a control subsystem or at least one processor in a robot (e.g., control subsystem 303 in robot 300) in conjunction with other components, such as, cameras or other imagers 320, input subsystem 312, manipulation subsystem 318, and the like. However, method 2000 may be performed by multiple controllers or by another system.

Method 2000 begins, for example, in response to an invocation by the controller. Prior to executing method 2000, the controller could initialize a robotic system including a robot. The controller could cause or direct a robot (e.g., robot 300) to boot, assume a rest pose, and await sensor data from one or more sensors. In response to receiving sensor data the robot can execute processor readable and executable instructions to perform acts 2002-2014. At 2002, controller receives information that represents an item in an environment associated with the robot (e.g., representation). The controller receives the information from at least one sensor in communication with the controller, such as, a camera or other imager, e.g., an image from cameras or other imagers 320. For example, the controller receives an image of part of an environment associated with the robot that may or may not include a target item. In some instances, the image includes at least one representation of all, or part of, the target item.

At 2004, the controller arranges, groups, or forms elements within the representation into in patches or clusters of like data attributes. More particularly, the controller changes information that represents elements within the representation into patches of like data attributes. At 2004 by executing processor-readable code that arranges the representations the controller localizes items within an scene, i.e., an image of an environment. For example, the controller groups image elements (e.g., pixel or voxel) into patches (e.g., clusters) of like image attributes (e.g., color or density). For example, the controller applies the Lloyd-Forgy method (also known as the K-Means Clustering method) to find patches of like colour. In Lloyd-Forgy and like methods, the controller partitions data into K clusters. Each cluster of the K clusters has an average value (e.g., mean, median, mode) an example of an aggregate value. Each datum in the data is associated with the cluster with an average value closest to the datum. Each patch in the patches of like data attributes includes other information, such as, a position (e.g., coordinates). For example, information that represents a patch includes a centroid. The centroid can be in image space or in object space (e.g., environment of item).

At 2006, controller creates aggregate values (e.g., average values) for one or more image attributes of the plurality of patches. That is, one inter patch aggregate value per patch. For example, the controller finds an intra patch average colour for each patch. For example, the controller creates a representative colour for a patch. In some implementations, the controller has found aggregate values for patches prior to act 2006 (e.g., as part of Lloyd-Forgy method).

At 2008, the controller acquires (e.g., receives or derives) an aggregate value for a target item. In some implementations, the controller acquires the aggregate value for the target item prior to act 2004. At 2010, the controller finds a patch whose aggregate value matches (e.g., close match, closest match) the aggregate value for the target item. For example, the controller finds a patch with an aggregate value that matches the aggregate value for the target item.

At 2012, the controller extracts a pose (e.g., position) for the patch whose aggregate value match the aggregate value for the target item. For example, the controller extracts the centroid of the patch. The centroid can be regarded as the pose for an item or at least the positon portion of the pose of the item. The pose for the item can include position, position and orientation, partial position, partial orientation, and the like.

At 2014, the controller creates, generates, or produces a signal that includes processor readable information that specifies or represents the centroid of the patch whose aggregate value matches the aggregate value for the target item. That is, specifies or represents a true or apparent position of the target item. The controller may produce, or generate, at least one signal that includes the information further comprising data that represents the plurality of clusters, the degree of match between the average value for the target item and at least one of the average values for the plurality of patches. The controller may return the information. Using the at least one signal the controller may store some or all of the information on, or within, at least one nontransitory tangible computer- and processor-readable storage media. The controller may send the at least one signal including the information through a communication channel. For example, the controller may send the information across communication channel 108. Method 2000 ends until invoked again.

Figure 21:
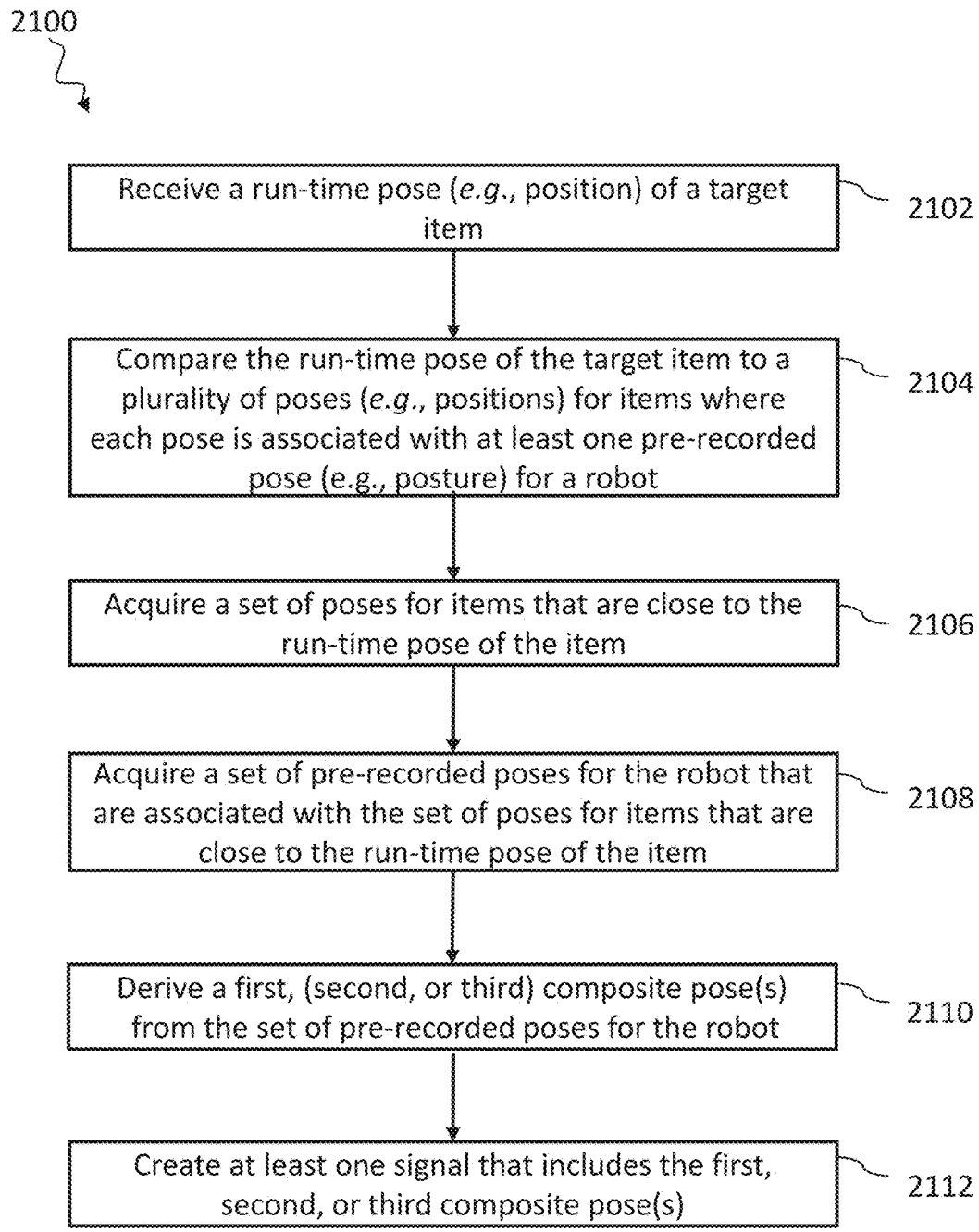
FIG. 21 is a flowchart illustrating methods of operation of a robotic system in accordance with present systems, devices, articles, and methods, in which one or more composite grasp poses are derived.

FIG. 21 illustrates method 2100 executable by a controller, such as circuitry or at least one hardware processor, for operation in a robotic system including a robot. Method 2100, describes a derivation of at least one composite pose for the robot. Method 2100 includes the identification of information that represents a set of pre-recorded robot poses. Those of skill in the art will appreciate that other acts may be included, removed, and/or varied, or performed in a different order, to accommodate alternative implementations. Method 2100 is described as being performed by a controller, for example, a control subsystem or at least one processor in a robot (e.g., control subsystem 303 in robot 300) in conjunction with other components (e.g., propulsion subsystem 316, manipulation subsystem 318, and the like in robot 300). However, method 2100 may be performed by multiple controllers or by another system.

Method 2100 begins, for example, in response to an invocation by the controller. At 2102, the controller receives information that specifies run-time pose for an item. For example, the controller receives information that specifies a pose, such as, a position (e.g., coordinates) for an item (e.g., target item) in an environment associated with a robot. The pose can include a two-dimensional position. The pose can include a three-dimensional pose. The pose can include a set of relative coordinates (or displacement(s) and/or angle(s)) from the robot (or a point on the robot). The pose can be specified by a set of absolute displacement(s) and/or angle(s) from a point in the environment. A pose can be or include a position or a posture. The pose of the item can include a location defined by up to three coordinates (e.g., xy, xyz, rθ, rθɸ, rθ z) and an orientation for the item defined by up to three coordinates.

At 2104, the controller compares the run-time pose of the item to information that represents a plurality of poses for items. A pose in the plurality of poses for items is associated with a plurality of poses for the robot. The controller has access to processor-readable information that represents a plurality of poses for items, and processor-readable information that represents a plurality of pre-recorded poses for the robot. The controller has access to processor-readable information that represents a plurality of associations between the plurality of poses for items and plurality of pre-recorded poses for the robot. The controller may search for a pose in the plurality of poses for items that matches the run-time pose of the target item.

At 2106, the controller acquires (e.g., retrieves or extracts) a set of poses for items that are close to the run-time pose of the target item. In some implementations, the control compares poses and acquires the set of poses for items that are near, close to, or match the run-time pose of the target item in one act. In some implementations, the controller compares poses by geometric distance. In some implementations, the controller compares poses by weighted geometric distance where a plurality of weights defines a metric of closeness that weights cardinal displacements differently.

At 2108, the controller acquires (e.g., retrieves or extracts) a set of pre-recorded poses for the robot that are associated with the set of poses for items that are close to the run-time pose of the item. In some implementations, the control compares poses, acquires the set of poses for the robot in one act. In some implementations, the set of poses for the robot are pre-recorded poses associated with piloted control instructions. In some implementations, the set of poses for the robot are pre-recorded poses associated with autonomous control instructions. In some implementations, at 2106 or 2108 the controller identifies information that represents a set of pre-recorded robot poses including at least one pre-recorded robot pose associated (e.g., logically associated) with a respective pose in the plurality of poses for items. The respective pose in the plurality of poses for items matches (e.g., exactly coincides, approximates, is near) the run-time pose of the target item. The controller, in identifying information that represents the set of pre-recorded robot poses, may search information that represents the plurality of pre-recorded poses for the robot.

At 2110, the controller derives a composite pose for the robot from the set of pre-recorded poses for the robot. A pose includes a plurality of parameters for one or more joints or actuators in a robot. For example, a pose includes one or more angles and/or one or more displacements for corresponding rotary and prismatic servos. A pose can be regarded as a configuration of a robot, or part of a robot (e.g., appendage, end-effector).

The parameters (e.g., joint angles) for a composite pose are weighted combination (e.g., sum) based on a first plurality of weights. In some implementations, a weight in the first plurality of weights is inversely proportional to the difference between the run-time pose for the target item and a pose in the set of poses for items. That is, the closer the target item is to known pose the more heavily the controller weights the parameters associated with the known pose. In some implementations, a composite pose is formed from a first plurality of weights to a set of pre-recorded robot poses. A respective weight in the plurality of weights is inversely propositional to a distance between a run-time pose of a target item and a respective pose in the plurality of poses for items. For example, for a parameter composite pose $\theta_C^i$ (here i-th parameter) could be:

$$\theta_C^i \propto \sum_{n=1}^{N} \frac{\theta_n^i}{[(x^n - x^T)^2 + (y^n - y^T)^2]^{\frac{1}{2}}}$$

That is, the parameter is proportional to the sum of associated parameters from the set of pre-recorded poses for robots ($\theta_n^i$) as inversely weighted by a distance from the run-time pose of the target item ($x^T$, $y^T$) to a respective pose for items associated with a respective pre-recorded poses for robots ($x^n$, $y^n$). The sum is repeated for all parameters of interest, e.g., $i \in [1, I]$ for $I \geq 1$. The denominator in the sum is an example of the weights in the first plurality of weights. In some implementations, a weight in the first plurality of weights is inversely proportional to a weighted difference between the run-time pose for the target item and a pose in the set of poses for items.

The weighted difference could be based, in part, on a second plurality of weights. For example, for the i-th composite pose parameter $\theta_C^i$ could be:

$$\theta_C^i \propto \sum_{n=1}^{N} \frac{\theta_n^i}{[w_1(x_1^n - x_1^T)^2 + w_2(x_2^n - x_2^T)^2 + \ldots]^{\frac{1}{2}}}$$

Here $w_1, w_2, \ldots$ are included in the second plurality of weights applied to displacements $x_1, x_2, \ldots$, e.g., three (3) displacements, relative to a pose the run-time pose of the target item $x_1^T, x_2^T, \ldots$. Other implementations employ other formulas to define composite poses. In some implementations, the weighted combination includes noise added to one or more weights in a plurality of weights, e.g., the first plurality of weights. For example, the controller may add noise, such as, zero mean Gaussian noise, to explore the space of possible grasps. The magnitude of the noise added by the controller would effect a trade-off between exploration and exploitation. For example, a larger standard would lead to more exploration of the space but potentially lead to fewer useable grasps, i.e., less exploitation. In some implementations, the controller may add noise to the parameters of a composite poise, e.g., joint angles and displacements. The controller may acquire information that represents pre-recorded poses that are rest, pre-grasp, mid-grasp, and post-grasp of one or more appendages and/or one or more end-effectors included in a robot. A mid-grasp pose for a robot is a pose for the robot as the robot grasps an object or item, e.g., items 208 and 210 shown in FIG. 2. Pre-grasp and post-grasp poses for a robot are poses for the robot before and after the robot, via its end-effectors, grasps an item.

At 2110, the controller may derive or create a first, second and third composite pose from the set of pre-recorded poses for the robot. For example, controller may derive or create composite poses for one or more appendages and/or one or more end-effectors included in a robot. The pre-recorded poses for the robot may include a plurality of pre-grasp poses. The controller may derive the first composite pose for the robot from the plurality of pre-grasp poses. The pre-recorded poses for the robot may include a plurality of mid-grasp poses (i.e., pose(s) of the robot as, or while, the robot grasps, holds, or otherwise releasably engages, an item). The controller may derive the second composite pose for the robot from the plurality of mid-grasp poses. The pre-recorded poses for the robot may include a plurality of post-grasp poses (i.e., after the robot has grasped an item and released the item from the grasp. The controller may derive the third composite pose for the robot from the plurality of post-grasp poses.

At 2112, the controller makes or produces a signal that includes information that represents the first, second, or third composite pose. In some implementations, the information represents the first composite pose, and the second composite pose. In some implementations, the information represents the first composite pose, the second composite pose, and the third composite pose. The controller may return the information. Using the at least one signal the controller may store some or all of the information on, or within, at least one nontransitory tangible computer- and processor-readable storage media. The controller may send the at least one signal including the information through a communication channel.

Method 2100 may be an implementation of act 1906 in method 1900. Prior to method 2000 the controller may initialize the robotic system. For example, the controller could cause or direct the robot to boot, assume a rest pose, and await processor readable information.

Figure 22:
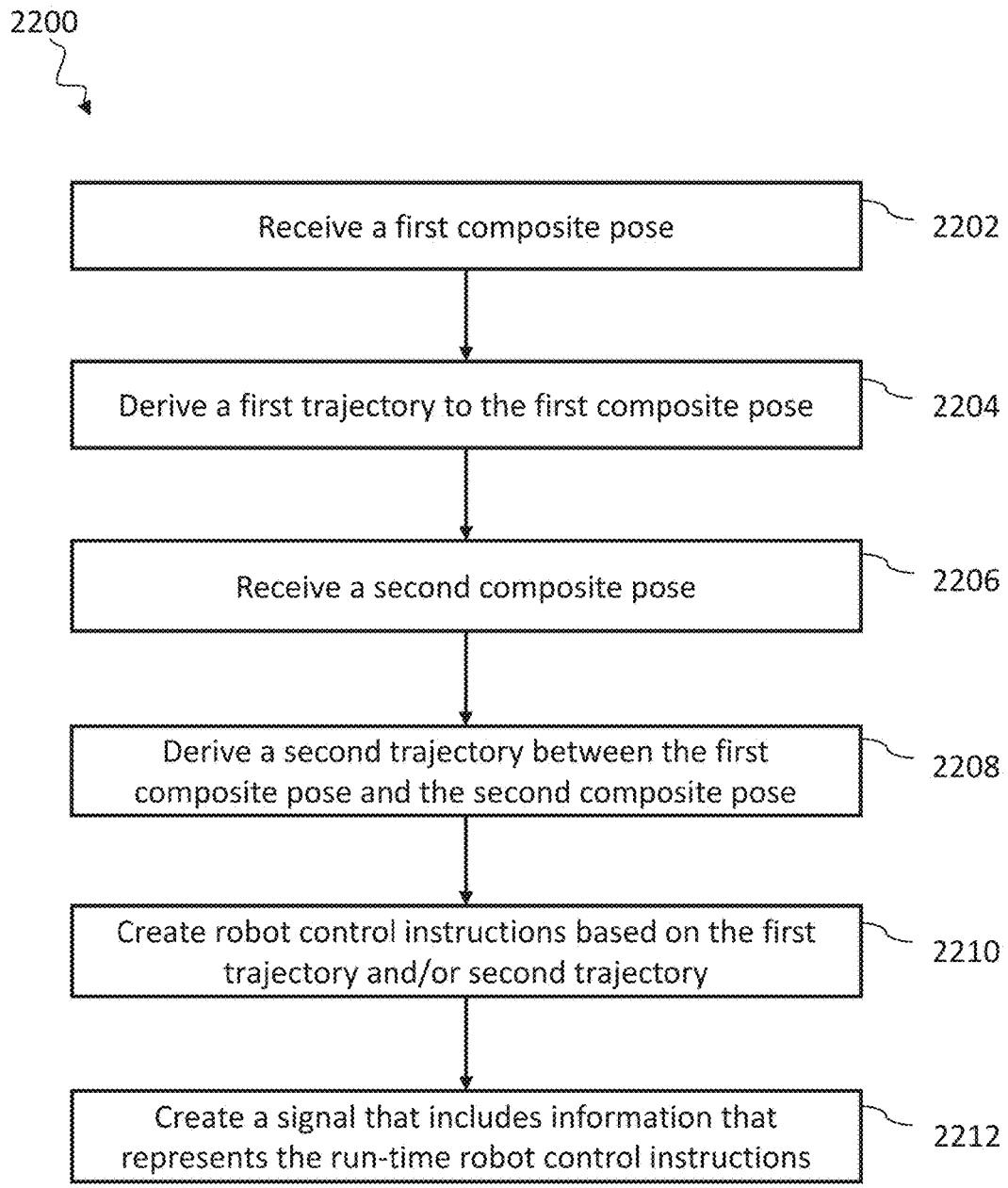
FIG. 22 is a flowchart illustrating methods of operation of a robotic system in accordance with present systems, devices, articles, and methods, in which one or more trajectories are derived from two or more poses.

FIG. 22 illustrates method 2200 executable by a controller, such as circuitry or at least one hardware processor, for operation in a robotic system. Method 2200, describes the derivation information for use in robot control instructions. Those of skill in the art will appreciate that other acts may be included, removed, and/or varied, or performed in a different order, to accommodate alternative implementations. Method 2200 is described as being performed by a controller, for example, a control subsystem or at least one processor in a robot (e.g., control subsystem 303 in robot 300) in conjunction with other components, such as, manipulation subsystem 318, and the like. However, method 2200 may be performed by multiple controllers or by another system.

Method 2200 begins, for example, in response to an invocation by the controller. At 2202, the controller receives a first composite pose. At 2204, the controller derives a first trajectory to the first composite pose, for example a first trajectory from a present pose to the first composite pose. The controller may use interpolation (e.g., linear interpolation) to derive the first trajectory. In some implementations, the trajectory includes or is based on a linear interpolate. In some implementations, a temporally shifted, truncated, and compressed sigmod function is used in the interpolation. The first composite pose can be a pre-grasp pose of a robot, an appendage, or an end-effector. The first trajectory may include motion of some or all of the robot, appendage, end-effector, or parts thereof, from rest to the first composite pose. The first composite pose may be a rest, pre-, mid-, or post-grasp pose. In some implementations, the next act in method 2200 is act 2210.

Optionally at 2206, the controller receives a second composite pose. At 2208, the controller derives a second trajectory between the first composite pose and the second composite pose. The controller may use interpolation to derive the second trajectory. The first and second trajectory may be time reversible and thus the temporal order of the composite poses may not matter. The first composite pose can be pre-grasp pose of a robot, an appendage, and an end-effector, while the second composite pose can be a mid-grasp pose. The second trajectory may include motion of some or all of the robot, appendage, end-effector, or parts thereof, from a (composite) pre-grasp pose to a (composite) mid-grasp pose. The controller may use interpolation (e.g., linear interpolation) to derive the second trajectory. The second trajectory may include a linear interpolate.

At 2210, the controller creates autonomous control instructions based on the first trajectory, the second trajectory, or both. The autonomous control instructions when executed by a processor based device causes a robot or a part of the robot to follow the first trajectory, the second trajectory, or both. The autonomous control instructions when executed by a processor based device causes a robot or a part of the robot to follow or assume the first composite pose, the second compose pose, or both. A composite pose may be at an end of a trajectory.

At 2212, the controller makes or produces a signal that includes information that represents the autonomous control instructions. In some implementations, the controller makes or produces a signal that includes information that represents the first trajectory, the second trajectory, or both.

Method 2200 may be performed with a plurality of composite poses and a plurality of trajectory. For example, a controller could create a third trajectory between the first composite pose and a third composite pose, or between the second composite pose and the third composite pose.

Figure 23:
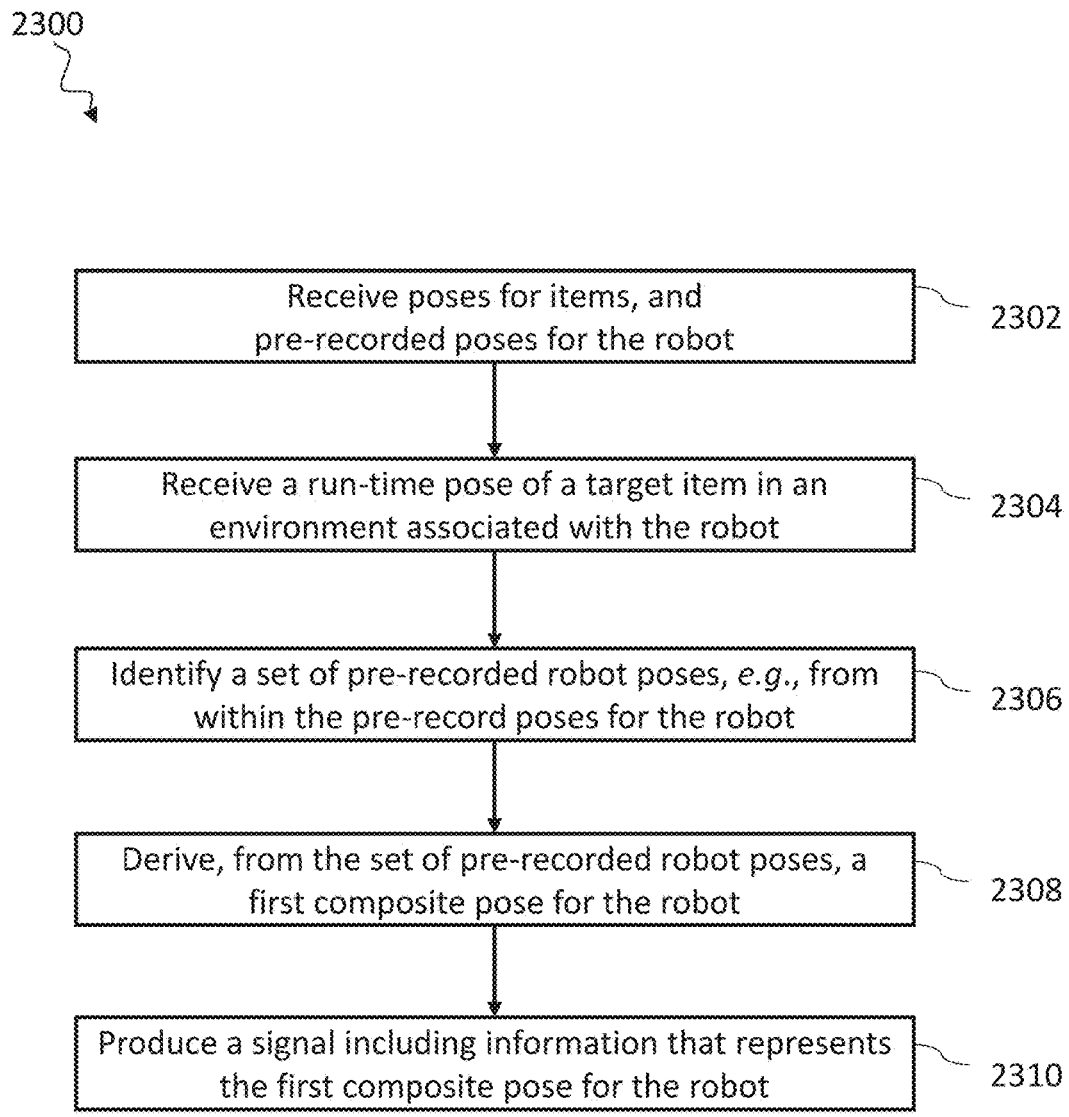
FIG. 23 is a flowchart illustrating methods of operation of a robotic system.

FIG. 23 illustrates method 2300 executable by a controller, such as circuitry or at least one hardware processor, for operation in a robotic system. Method 2300, is a method of operation in a robotic system. Those of skill in the art will appreciate that other acts may be included, removed, and/or varied, or performed in a different order, to accommodate alternative implementations. Method 2300 is described as being performed by a controller, for example, a control subsystem or at least one processor in a robot in conjunction with other components. However, method 2300 may be performed by multiple controllers or by another system.

Method 2300 begins, for example, in response to an invocation by the controller. At 2302, the controller receives information that represents poses for items, and pre-recorded poses for a robot. See for example robot 202 and item 208 in environment 200 shown in FIG. 2. A respective pose in the pre-recorded poses for the robot is associated (e.g., logically associated in nontransitory processor-readable media) with at least one respective pose in the poses for items. The controller may receive the information in response to a query to another processor based system or at least one computer and processor readable storage media, e.g., storage devices 110. The controller may receive the information across a communication channel, such as, communication channel 108.

At 2304, the controller receives a run-time pose (e.g., a position) of a target item in an environment associated with the robot (e.g., robot 202 in environment 200). The run-time pose of the target item can be specified in information that represents position, position and orientation, or the like. The run-time pose of the item may be relative to the robot. Examples of pose, including relative and absolute position and/or posture, are described herein at least in relation to FIGS. 13 and 14. Methods for the derivation of a pose for an item are described herein in relation to, at least, FIG. 20. The controller may extract the pose of the target item from a patch within a representation of an environment associated with the robot. The controller may acquire the representation, e.g., an image, from sensor information provided by at least one sensor, such as, cameras or other imagers 320. At 2306, the controller identifies a set of pre-recorded robot poses including at least one pre-recorded robot pose associated (e.g., logically associated on or within at least one nontransitory processor readable media) with a respective pose in the plurality of poses for items. The respective pose in the poses for items matches, is near, or approximates (generally matches) the run-time pose of the target item. For example, the controller identifies the set of pre-recorded robot poses within information stored on or within at least one nontransitory processor readable media. The controller, in identifying the set of pre-recorded robot poses, may search within or amongst information that represents a plurality of pre-recorded poses for the robot. The execution of a method to identify the set of pre-recorded set of robot poses is described herein in relation to, at least, FIG. 21.

In various implementations, at 2306 the controller searches the pre-recorded poses for the robot for a particular set of pre-recorded robot poses. A respective pose in the set of pre-recorded robot poses is associated (e.g., logically associated in nontransitory processor-readable media) with a respective pose in the poses for items, and the respective pose in the poses for items matches, is near, or approximates the run-time pose of the target item. The controller may use data structure 2400, described herein at least as FIG. 24, to search for and/or acquire a set of pre-recorded robot poses. The controller may use data structure 2400 to store logically associations between one or more pre-recorded robot poses and one or more poses for items. The execution of a method to search for the set of pre-recorded set of robot poses described herein in relation to, at least, FIG. 21.

At 2308, the controller derives a first composite pose for the robot from the set of pre-recorded robot poses. A composite pose may comprise a weighted combination of pre-recorded poses. For example, the controller may assign a plurality of weights to a set of pre-recorded robot poses wherein a respective weight in the plurality of weights is inversely propositional to a distance between a run-time pose of a target item and a respective pose in a plurality of poses for items. Examples of the plurality of weights are described herein at least in relation to FIG. 22. The controller may use information that specifies the composite pose in robot control instructions.

At 2310, the controller produces, makes, or generates a signal including processor readable information that represents the first composite pose for the robot. The controller may use the signal to store the information on at least one computer and processor readable storage media, e.g., storage devices 110. The controller may send the signal through a communication channel, e.g., communication channels 108.

Figure 24:
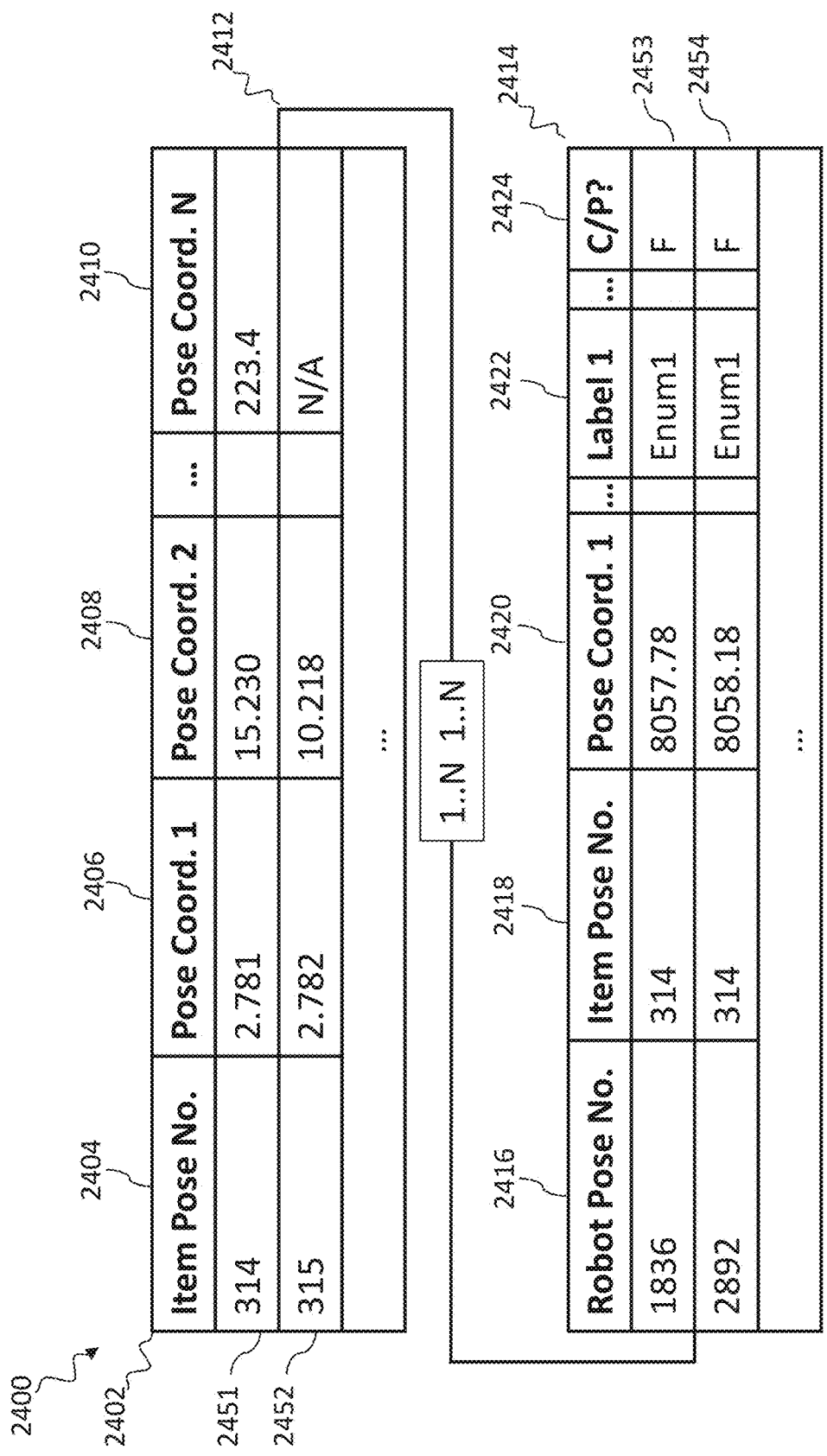
FIG. 24 is a schematic diagram illustrating a data structure for use in operation of a robotic system.

FIG. 24 is a schematic diagram illustrating a data structure 2400 for use in operation of a robotic system. In at least methods 1900, 2000, 2100, 2200, and 2300, a controller may acquire and execute robot control instructions or the like. The controller may make use of one or more data structures. Data structure 2400 is an exemplary data structure, a set of linked tables, although other data structures (e.g., records with fields, binary tree, directed acyclic graph) could be employed. Data structure 2400 includes processor-readable data or information. A controller may store, access, or update data structure 2400 on, or within, at least one nontransitory or tangible computer- or processor-readable storage medium.

Data structure 2400 includes an item pose table 2402. The item pose table 2402 includes a header row with fields 2404, 2406, and so on. An index field 2404 denotes an identifier (e.g., row number). Entries in item pose table 2402 may be uniquely identified by the identifier stored in index field 2404. Index field 2404, can in some implementations, be used as a relational key for item pose table 2402.

An item pose first coordinate field 2406 stores a coordinate (e.g., angle or displacement) for a first coordinate for the pose of an item. The controller may search table 2402 for item poses that match one or more coordinates, e.g., values in first coordinate field 2406. Information that specifies an item pose may include a plurality of coordinates. An item pose second coordinate field 2408 may store a coordinate (e.g., angle or displacement) for a second coordinate for the pose of an item. For example, the first coordinate could be a horizontal distance and the second an angle. Table 2402 may include further item pose coordinates. For example, up to including item pose N-th coordinate field 2410. At least of field 2406, field 2408, through to field 2410 is not null. The controller may search table 2402 for item poses that match one or more coordinates, e.g., values in at least one of the first coordinate field 2406, second coordinate field 2408, up to the N-th coordinate field 2410.

Item pose table 2402 may be linked to further tables via a relational link 2412. Relational link can in various implementations have different cardinality: many-to-one, many-to-many, and the like. Cardinality is one aspect of association (e.g., logically associated) between a respective pose in a respective pose in the plurality of poses for items and other poses such a respective pose in a plurality of pre-recorded poses for a robot. Item pose table 2402 may be linked via relational link 2412 to robot pose table 2414. In various implementations, table 2402 and table 2414 are logically associated in at least one nontransitory computer readable media.

Data structure 2400 includes a robot pose table 2414. Robot pose table 2414 includes a header row with fields 2416, 2418, 2420, 2422 and 2424. An index field 2416 denotes an identifier (e.g., row number). Entries in robot pose table 2414 may be uniquely identified by the identifier. Index field 2416, can in some implementations, be used as a relational key for robot pose table 2414. Table 2414 includes a reference index field 2418 that may store the identifier to an item pose in item pose table 2402.

Robot pose table 2414 includes a first pose coordinate 2420. Field 2420 stores a coordinate (e.g., angle or displacement) for a robot or a part of a robot (e.g., end-effector). Robot pose table 2414 may include a plurality of robot pose coordinates. Each of the robot pose coordinates (e.g., information stored in fields 2420 and so on) can be associate with a plurality of configuration parameters for one more parts of a robot. Robot pose coordinates include an angle for a rotary servo, a displacement for a prismatic servo or actuator, and the like.

A pose label field 2422 stores a value (e.g., enumerated type, value in dependent table) that identifies or defines a robot pose. A controller may use pose label field 2422 to identify, mark, or tag a robot pose as a rest pose, pre-, mid-, or post-grasp pose, and the like. In some implementations, a post-grasp pose is a rest pose. A post-grasp pose may be pre-grasp pose.

A composite pose type field 2424 stores a Boolean, flag or other value that represents whether a respective pose in the robot pose table 2414 is a composite pose. For example, a pose created by a controller executing method 2100.

Data structure 2400 can include one or more rows of data associated with one or more poses. For example, row 2451 in item pose table 2402 is associated with an item pose 314, and row 2452 is associated with an item pose 315. Each of row 2451 and row 2452 specifies one or more coordinates for a respective item pose. Row 2453 and row 2454 in robot pose table 2414 are associated with the item pose 314. Each of row 2453 and row 2454 specifies one or more coordinates for a respective robot pose.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure. For example, those skilled in the relevant art can readily create processor executable instructions based on the methods described herein including flowcharts in the drawings, such as, FIGS. 6-10, 12, 15-17, and 19-23, and the detailed description provided herein.

For instance, the foregoing detailed description has set forth various examples and embodiments of computer- and processor-readable information and data via the use of one or more block and schematic diagrams. Insofar as such block and schematic diagrams contain information, one or more data structures, or the like, it will be understood by those skilled in the art that the data structures and information included in such block and schematic diagrams can be implemented, individually and/or collectively, by a wide range of hardware, software, firmware, or combinations thereof. It will be further understood by those skilled in the art that the data structures and information within such block and schematic diagrams can be stored, updated, or read as computer- or processor-readable information upon, within, or from at least one nontransitory computer- or processor-readable storage medium. For example, those skilled in the relevant art can readily create computer- or processor-readable information based on the information and data structures described herein including those shown or described in FIGS. 3, 11, 18, and 24.

As used herein processor-executable instructions and/or processor-readable data can be stored on any nontransitory computer-readable storage medium, e.g., memory or disk, for use by or in connection with any processor-related system or method. In the context of this specification, a "computer-readable storage medium" is one or more tangible nontransitory computer-readable storage medium or element that can store processor-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary or desirable, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. To the extent that they are not inconsistent with the specific teachings and definitions herein, U.S. Provisional Patent Application No. 62/214,667 filed Sep. 4, 2015; U.S. Provisional Patent Application No. 62/255,899 filed Nov. 16, 2015; U.S. Provisional Patent Application No. 62/261,602 filed Dec. 1, 2015; U.S. Provisional Patent Application No. 62/271,130 filed Dec. 22, 2015; U.S. Provisional Patent Application No. 62/302,575 filed Mar. 2, 2016; U.S. Provisional Patent Application No. 62/308,656 filed Mar. 15, 2016; U.S. Provisional Patent Application No. 62/332,858 filed May 6, 2016; U.S. Provisional Patent Application No. 62/340,907 filed May 24, 2016; and U.S. Provisional Application No. 62/348,513 filed Jun. 10, 2016 are each incorporated herein by reference, in their entirety. Aspects of the embodiments can be modified, if necessary, to employ systems, circuits and concepts of the various patents, applications and publications to provide yet further embodiments.

The invention claimed is:

1. A method of operation in a robotic system including a robot, at least one processor in communication with the robot, and an operator interface in communication with the robot and the at least one processor, the method comprising:
  receiving, by the at least one processor, a first set of autonomous robot control instructions which when executed causes the robot to autonomously perform at least one task;
  receiving, at the at least one processor from at least one sensor, a first set of environmental sensor data that represents an environment of the robot;
  executing, by the at least one processor, the first set of autonomous robot control instructions which causes the robot to autonomously perform the at least one task in an autonomous mode;
  generating, by the at least one processor, as a result of the robot completing execution of the first set of autonomous robot control instructions in the autonomous mode, a second set of autonomous robot control instructions from the first set of autonomous robot control instructions and the first set of environmental sensor data, wherein the second set of autonomous robot control instructions when executed causes the robot to autonomously perform a modified version of the at least one task; and
  producing, by the at least one processor, at least one signal that represents the second set of autonomous robot control instructions.

2. The method of claim 1 wherein the at least one task comprises:
  gripping, by the robot, an item.

3. The method of claim 1 wherein the at least one task is selected from the group consisting of:
  identifying an item;
  releasing an item; and
  placing an item in an order container.

4. The method of claim 1 wherein executing the first set of autonomous robot control instructions is autonomously performed in response to detection of a defined condition or defined feature in the first set of environmental sensor data.

5. The method of claim 1, further comprising:
  generating, by the at least one processor, information that represents completion of the at least one task in the autonomous mode from the at least one sensor.

6. The method of claim 1, further comprising:
  updating, by the at least one processor, at least one nontransitory tangible computer-readable storage medium with the second set of autonomous control instructions.

7. The method of claim 1, further comprising:
  causing, by the at least one processor, the at least one signal to be sent across a network.

8. The method of claim 1, further comprising:
  receiving, by the at least one processor, a set of piloted robot control instructions which when executed causes the robot to simulate the at least one task performed by an operator;
  receiving, by the at least one processor, a second set of environmental sensor data that represents the environment of the robot during the performance of the at least one task; and
  generating, by the at least one processor, the first set of autonomous control instructions from the pilot control instructions, and the second set of environmental sensor data.

9. The method of claim 8 wherein generating, by the at least one processor, a second set of autonomous robot control instructions, further comprises:
  generating, by the at least one processor, the second set of autonomous robot control instructions from the set of piloted robot control instructions, the first set of autonomous robot control instructions, the first set of environmental sensor data, and the second set of environmental sensor data.

10. The method of claim 1, further comprising:
  receiving, by the at least one processor, annotation data created by at least one human observer of the robot,
  wherein, the annotation data represents completion of the at least one task in the autonomous mode.

11. The method of claim 10 wherein the at least one task includes one or more of: grasping an item, releasing an item, or placing an item in an order container, and receiving annotation data created by at least one human observer of the robot includes receiving annotation data that indicates whether the robot has grasped the item, released the item or placed the item in the order container.

12. A system comprising:
  at least one processor;
  a robot;
  an operator interface communicatively coupled to the robot and the at least one processor;
  at least one sensor communicatively coupled to the at least one processor; and
  at least one nontransitory processor-readable storage device communicatively coupled to the at least one processor and which stores processor-executable instructions which, when executed by the at least one processor, cause the at least one processor to:
    receive a first set of autonomous robot control instructions which when executed causes the robot to autonomously perform at least one task;
    receive from at least one sensor, a first set of environmental sensor data that represents an environment of the robot;
    execute the first set of autonomous robot control instructions which causes the robot to autonomously perform the at least one task in an autonomous mode;
    generate a second set of autonomous robot control instructions from the first set of autonomous robot control instructions and the first set of environmental sensor data, wherein the second set of autonomous robot control instructions include a machine learning model or an artificial intelligence model that, as a result of execution, causes the robot to autonomously perform the at least one task; and
    produce at least one signal that represents the second set of autonomous robot control instructions.

13. The system of claim 12, wherein:
  the at least one task comprises the robot gripping an item; and
  when executed, the processor-executable instructions further cause the at least one processor to direct the robot to grip the item.

14. The system of claim 12, wherein the at least one task is selected from the group consisting of:
  identify an item;
  release an item; and
  place an item in an order container.

15. The system of claim 12, wherein, when executed, the processor-executable instructions further cause the at least one processor to:
  detect a defined condition or defined feature in the first set of environmental sensor data; and
  in response to detection of the defined condition or defined feature, cause the at least one processor to execute the first set of autonomous robot control instructions which causes the robot to autonomously perform the at least one task in the autonomous mode.

16. The system of claim 12, wherein, when executed, the processor-executable instructions further cause the at least one processor to:
  generate information that represents completion of the at least one task in the autonomous mode from the at least one sensor.

17. The system of claim 12, wherein, when executed, the processor-executable instructions further cause the at least one processor to:
  receive annotation data created by at least one human observer of the robot, wherein, the annotation data represents completion of the at least one task in the autonomous mode.

18. The system of claim 12, wherein, when executed, the processor-executable instructions further cause the at least one processor to:
  update, based on based on the at least one signal that represents the second set of autonomous robot control instructions, the at least one nontransitory processor-readable storage device with the second set of autonomous control instructions.

19. The system of claim 12, further comprising:
  a communication channel communicatively coupled to the at least one processor; and
  wherein, when executed, the processor-executable instructions further cause the at least one processor to direct the at least one signal that represents the second set of autonomous robot control instructions to be sent through the communication channel.

20. The system of claim 12, wherein, when executed, the processor-executable instructions further cause the at least one processor to:
  receive a set of piloted robot control instructions which when executed causes the robot to simulate the at least one task performed by an operator at the operator interface;
  receive from the at least one sensor a second set of environmental sensor data that represents the environment of the robot during the performance of the at least one task; and
  generate the first set of autonomous control instructions from the pilot control instructions, and the second set of environmental sensor data.

21. The system of claim 20, wherein, when executed, the processor-executable instructions further cause the at least one processor to:
  generate the second set of autonomous robot control instructions from the set of piloted robot control instructions, the first set of autonomous robot control instructions, the first set of environmental sensor data, and the second set of environmental sensor data.

22. A method of operation in a robotic system including a robot. at least one processor in communication with the robot, and an operator interface in communication with the robot and the at least one processor, the method comprising:
  receiving, by a first processor separate from the robot, a first set of autonomous robot control instructions that. as a result of execution, cause the robot to autonomously perform at least one task;
  receiving, at the first processor, a first set of environmental sensor data that represents an environment of the robot;
  executing, by the first processor, the first set of autonomous robot control instructions which causes the robot to autonomously perform the at least one task in an autonomous mode; and
  generating, by a second processor that is part of the robot, a second set of autonomous robot control instructions from the first set of autonomous robot control instructions and the first set of environmental sensor data, wherein the second set of autonomous robot control instructions that, as a result of execution, cause the robot to autonomously perform the at least one task.

* * * * *